United States Patent
Alves et al.

(10) Patent No.: US 12,520,080 B2
(45) Date of Patent: Jan. 6, 2026

(54) AUDIO PROCESSING BASED ON TARGET SIGNAL-TO-NOISE RATIO

(71) Applicant: QUALCOMM Incorporated, San Diego, CA (US)

(72) Inventors: Rogerio Guedes Alves, Macomb Township, MI (US); Jacob Jon Bean, Vista, CA (US); Erik Visser, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 246 days.

(21) Appl. No.: 18/323,176

(22) Filed: May 24, 2023

(65) Prior Publication Data

US 2024/0334125 A1     Oct. 3, 2024

Related U.S. Application Data

(60) Provisional application No. 63/493,158, filed on Mar. 30, 2023.

(51) Int. Cl.
 *H04R 3/04*         (2006.01)
 *G06F 1/16*         (2006.01)
 (Continued)

(52) U.S. Cl.
 CPC ............... *H04R 3/04* (2013.01); *G06F 1/163* (2013.01); *G10L 21/0216* (2013.01);
 (Continued)

(58) Field of Classification Search
 CPC ......... H04R 3/04; H04R 1/1083; G06F 1/163; G10L 21/0216; G10L 21/0224;
 (Continued)

(56) References Cited

U.S. PATENT DOCUMENTS

| 11,114,109 B2 | 9/2021 | Bryan et al. |
| 11,558,699 B2 | 1/2023 | Durrieu |

(Continued)

FOREIGN PATENT DOCUMENTS

| CN | 114566179 A | 5/2022 |
| EP | 3694229 A1 | 8/2020 |
| EP | 3998557 A1 | 5/2022 |

OTHER PUBLICATIONS

Sunohara M., et al., "Low-Latency Real-Time Blind Source Separation for Hearing Aids Based on Time-Domain Implementation of Online Independent Vector Analysis with Truncation of Non-Causal Components", IEEE, 2017, pp. 216-220.

(Continued)

*Primary Examiner* — Xu Mei
(74) *Attorney, Agent, or Firm* — QUALCOMM Incorporated; Espartaco Diaz Hidalgo

(57) ABSTRACT

A device includes one or more processors configured to obtain data specifying a target signal-to-noise ratio based on a hearing condition of a person and to obtain audio data representing one or more audio signals. The one or more processors are configured to determine, based on the target signal-to-noise ratio, a first gain to apply to first components of the audio data and a second gain to apply to second components of the audio data. The one or more processors are configured to apply the first gain to the first components of the audio data to generate a target signal and to apply the second gain to the second components of the audio data to generate a noise signal. The one or more processors are further configured to combine the target signal and the noise signal to generate an output audio signal.

30 Claims, 12 Drawing Sheets

(51) Int. Cl.
*G10L 21/0216* (2013.01)
*G10L 21/0224* (2013.01)
*G10L 21/0232* (2013.01)

(52) U.S. Cl.
CPC ...... *G10L 21/0224* (2013.01); *G10L 21/0232* (2013.01); *G10L 2021/02166* (2013.01)

(58) Field of Classification Search
CPC ....... G10L 21/0232; G10L 2021/02166; G10L 21/0272; G10L 21/0208
USPC ................ 381/98, 317, 320, 321, 94.1–94.9
See application file for complete search history.

(56) References Cited

U.S. PATENT DOCUMENTS

| | | | |
|---|---|---|---|
| 11,727,912 B1 | 8/2023 | Rao et al. | |
| 2013/0142343 A1 | 6/2013 | Matsui et al. | |
| 2018/0054681 A1* | 2/2018 | Woods | H04R 25/43 |
| 2018/0366138 A1 | 12/2018 | Ramprashad | |
| 2019/0378531 A1* | 12/2019 | Jensen | G10L 21/0232 |
| 2020/0176012 A1 | 6/2020 | Herbig et al. | |
| 2020/0184987 A1 | 6/2020 | Kupryjanow et al. | |
| 2020/0260198 A1* | 8/2020 | Andersen | H04R 25/552 |
| 2021/0058713 A1* | 2/2021 | Jensen | H04R 25/453 |
| 2021/0074282 A1 | 3/2021 | Borgstrom et al. | |
| 2021/0125625 A1 | 4/2021 | Huang et al. | |
| 2021/0343306 A1 | 11/2021 | Visser et al. | |
| 2021/0352415 A1 | 11/2021 | Jensen | |
| 2022/0095061 A1 | 3/2022 | Diehl et al. | |
| 2022/0262336 A1 | 8/2022 | Truong et al. | |
| 2022/0369031 A1 | 11/2022 | Lester et al. | |
| 2023/0046518 A1 | 2/2023 | Gao et al. | |
| 2023/0143347 A1 | 5/2023 | Jin et al. | |
| 2023/0328463 A1 | 10/2023 | Fitz et al. | |
| 2023/0353929 A1 | 11/2023 | Kim et al. | |
| 2024/0331679 A1 | 10/2024 | Montazeri et al. | |
| 2024/0331716 A1 | 10/2024 | Bean et al. | |

OTHER PUBLICATIONS

International Search Report and Written Opinion—PCT/US2024/020079—ISA/EPO—May 28, 2024.

Zheng C., et al., "Low-Latency Monaural Speech Enhancement with Deep Filter-Bank Equalizer", The Journal of the Acoustical Society of America, American Institute of Physics, 2 Huntington Quadrangle, Melville, NY 11747, vol. 151, No. 5, May 19, 2022, pp. 3291-3304, XP012265858, abstract, figures 2,3.

Lollmann H W., et al., "Generalized Filter-Bank Equalizer for Noise Reduction with Reduced Signal Delay", Institute of Communication Systems and Data Processing, Jan. 2005, 5 Pages.

Zhang H., et al., "DEEP AHS: A Deep Learning Approach to Acoustic Howling Suppression", arxiv.org, Cornell University Library, 201 Olin Library Cornell University Ithaca, NY 14853, arXiv:2302.09252v1 [eess.AS], Feb. 18, 2023, XP091442175, Figure 2, Figure 1b, Section 3.3, Equation 3, 5 Pages.

* cited by examiner

AUDIO PROCESSING BASED ON TARGET SIGNAL-TO-NOISE RATIO

I. CROSS-REFERENCE TO RELATED APPLICATIONS

The present application claims priority from U.S. Provisional Patent Application No. 63/493,158, filed Mar. 30, 2023, entitled "LOW LATENCY NOISE SUPPRESSION," which is incorporated herein by reference in its entirety.

II. FIELD

The present disclosure is generally related to audio processing based on a target signal-to-noise ratio.

III. DESCRIPTION OF RELATED ART

Hearing-related problems of various types affect a significant number of people. For example, one common problem is that even people with relatively normal hearing can find it difficult to hear speech in noisy environments, and the problem can be considerably worse for those with hearing loss. For some individuals, speech is readily intelligible only when the signal-to-noise ratio (of the speech relative to ambient noise) is above a certain level.

Wearable devices (e.g., ear buds, headphones, hearing aids, etc.) can be used to improve hearing, situational awareness, intelligibility of speech, etc. in many circumstances. Generally, such devices apply relatively simple noise suppression processes to remove as much of the ambient noise as possible. While such noise suppression processes can improve the signal-to-noise ratio sufficiently for speech to be intelligible, these noise suppression processes may also reduce situational awareness of the user since these processes attempt to simply remove as much noise as possible, thereby possibly removing important environmental cues, such as traffic sounds. Use of more complex noise suppression processes can introduce significant latency. Latency in processing real-time speech can lead to user dissatisfaction.

IV. SUMMARY

According to one implementation of the present disclosure, a device includes one or more processors configured to obtain data specifying a target signal-to-noise ratio based on a hearing condition of a person and to obtain audio data representing one or more audio signals. The one or more processors are configured to determine, based on the target signal-to-noise ratio, a first gain to apply to first components of the audio data and a second gain to apply to second components of the audio data. The one or more processors are configured to apply the first gain to the first components of the audio data to generate a target signal and to apply the second gain to the second components of the audio data to generate a noise signal. The one or more processors are further configured to combine the target signal and the noise signal to generate an output audio signal.

According to another implementation of the present disclosure, a method includes obtaining, at one or more processors, data specifying a target signal-to-noise ratio based on a hearing condition of a person and obtaining, at the one or more processors, audio data representing one or more audio signals. The method also includes determining, at the one or more processors based on the target signal-to-noise ratio, a first gain to apply to first components of the audio data and a second gain to apply to second components of the audio data. The method also includes applying the first gain to the first components of the audio data to generate a target signal and applying the second gain to the second components of the audio data to generate a noise signal. The method also includes combining the target signal and the noise signal to generate an output audio signal.

According to another implementation of the present disclosure, a non-transitory computer-readable medium stores instructions that are executable by one or more processors to cause the one or more processors to obtain data specifying a target signal-to-noise ratio based on a hearing condition of a person and to obtain audio data representing one or more audio signals. The instruction further cause the one or more processors to determine, based on the target signal-to-noise ratio, a first gain to apply to first components of the audio data and a second gain to apply to second components of the audio data. The instruction further cause the one or more processors to apply the first gain to the first components of the audio data to generate a target signal and to apply the second gain to the second components of the audio data to generate a noise signal. The instruction further cause the one or more processors to combine the target signal and the noise signal to generate an output audio signal.

According to another implementation of the present disclosure, an apparatus includes means for obtaining data specifying a target signal-to-noise ratio based on a hearing condition of a person. The apparatus further includes means for obtaining audio data representing one or more audio signals. The apparatus further includes means for determining, based on the target signal-to-noise ratio, a first gain to apply to first components of the audio data and a second gain to apply to second components of the audio data. The apparatus further includes means for applying the first gain to the first components of the audio data to generate a target signal. The apparatus further includes means for applying the second gain to the second components of the audio data to generate a noise signal. The apparatus further includes means for combining the target signal and the noise signal to generate an output audio signal.

Other aspects, advantages, and features of the present disclosure will become apparent after review of the entire application, including the following sections: Brief Description of the Drawings, Detailed Description, and the Claims.

V. BRIEF DESCRIPTION OF THE DRAWINGS

VI. DETAILED DESCRIPTION

Figure 1:
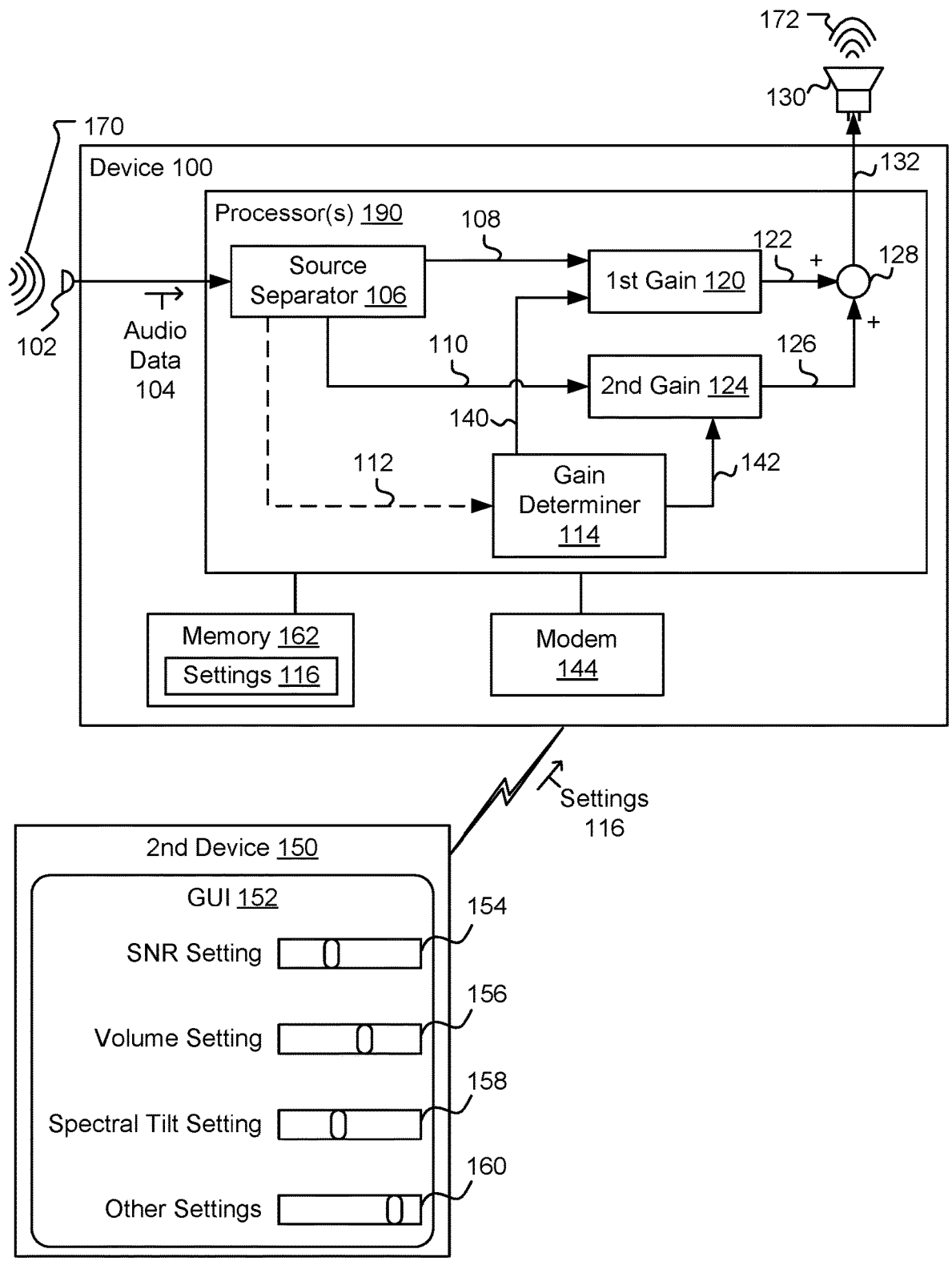
FIG. 1 is a block diagram of particular aspects of a device operable to perform audio processing based on a target signal-to-noise ratio, in accordance with some examples of the present disclosure.

Aspects disclosed herein enable audio processing in a manner that assists hearing by adjusting levels of speech (or other target sounds) and noise (e.g., non-target sounds) separately and mixing resulting signals to meet a target signal-to-noise ratio (SNR). As one example, if the target SNR is 15 dB, gain applied to target sound and non-target sound signals is selected to provide a 15 dB SNR in an output audio signal. In this example, 15 dB is merely illustrative. In some implementations, the target SNR can be user-configurable (e.g., based on settings specified via an application and uploaded to a wearable device, such as ear buds, headphones, or hearing aids). As an example, the target SNR can be configured via a smartphone application that is used to control or manipulate settings of the wearable device.

One challenge of providing a consistent SNR of the output audio signal is latency associated with reliably separating an input audio signal into target and non-target audio components. Higher quality source separation can be performed in the frequency domain than in the time domain; however, frequency-domain processing introduces significant latency, which may result in an unfavorable user experience. In contrast, time-domain processing can provide low-latency, but has difficulty reliably separating target and non-target sources, especially in dynamic environments.

In some implementations, these challenges are addressed by using low-latency time-domain processing for source separation. For example, low-latency recurrent neural networks can be used to distinguish target and non-target audio components. In other implementations, these challenges are addressed by combining time-domain and frequency-domain processes. To illustrate, time-domain processing can be used for source separation, where the time-domain processing is guided by (e.g., controlled or adjusted based on) output of frequency-domain processing. For example, frequency-domain processing can be used to determine filter coefficients used by time-domain filters to separate audio data into target and non-target components. In this example, the time-domain filters generate a signal representing target audio components and a signal representing non-target audio components. After the target and non-target audio components are separated, the resulting signals are separately gain adjusted and mixed to generate an output audio signal having the target SNR.

Time-domain filters generated based on frequency-domain processing provide high-quality source separation, and low-latency is achieved by separating the time-domain and frequency-domain processing paths such that the time-domain processing path is updated whenever new time-domain filter coefficients are available from the frequency-domain processing path. In such implementations, the time-domain filter coefficients determined based on frequency-domain processing provide significantly better noise suppression than traditional time-domain only approaches, such as adaptive noise cancellation. Further, since the time-domain filter coefficients are applied to receive audio data in the time domain, little or no latency is added by using such time-domain filter coefficients to process the audio data.

Particular aspects of the present disclosure are described below with reference to the drawings. In the description, common features are designated by common reference numbers. As used herein, various terminology is used for the purpose of describing particular implementations only and is not intended to be limiting of implementations. For example, the singular forms "a," "an," and "the" are intended to include the plural forms as well, unless the context clearly indicates otherwise. Further, some features described herein are singular in some implementations and plural in other implementations. To illustrate, FIG. 1 depicts a device 100 including one or more processors ("processor(s)" 190 of FIG. 1), which indicates that in some implementations the device 100 includes a single processor 190 and in other implementations the device 100 includes multiple processors 190. For ease of reference herein, such features are generally introduced as "one or more" features and are subsequently referred to in the singular or optional plural (as indicated by "(s)") unless aspects related to multiple of the features are being described.

In some drawings, multiple instances of a particular type of feature are used. Although these features are physically and/or logically distinct, the same reference number is used for each, and the different instances are distinguished by addition of a letter to the reference number. When the features as a group or a type are referred to herein e.g., when no particular one of the features is being referenced, the reference number is used without a distinguishing letter. However, when one particular feature of multiple features of the same type is referred to herein, the reference number is used with the distinguishing letter. For example, referring to FIG. 2, multiple microphones are illustrated and associated with reference numbers 102A and 102B. When referring to a particular one of these microphones, such as a microphone 102A, the distinguishing letter "A" is used. However, when referring to any arbitrary one of these microphones or to these microphones as a group, the reference number 102 is used without a distinguishing letter.

As used herein, the terms "comprise," "comprises," and "comprising" may be used interchangeably with "include," "includes," or "including." Additionally, the term "wherein" may be used interchangeably with "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to one or more of a particular element, and the term "plurality" refers to multiple (e.g., two or more) of a particular element.

As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive signals (e.g., digital signals or analog signals) directly or indirectly, via one or more wires, buses, networks, etc. As used herein, "directly coupled" may include two devices that are coupled (e.g., communicatively coupled, electrically coupled, or physically coupled) without intervening components.

In the present disclosure, terms such as "determining," "calculating," "estimating," "shifting," "adjusting," etc. may be used to describe how one or more operations are performed. It should be noted that such terms are not to be construed as limiting and other techniques may be utilized to perform similar operations. Additionally, as referred to herein, "generating," "calculating," "estimating," "using," "selecting," "accessing," and "determining" may be used interchangeably. For example, "generating," "calculating," "estimating," or "determining" a parameter (or a signal) may refer to actively generating, estimating, calculating, or determining the parameter (or the signal) or may refer to using, selecting, or accessing the parameter (or signal) that is already generated, such as by another component or device.

FIG. 1 is a block diagram of particular aspects of a device 100 operable to perform audio processing based on a target SNR, in accordance with some examples of the present disclosure. In FIG. 1, the device 100 includes one or more processors 190 coupled to one or more microphones 102 and to one or more speakers 130. As an example, the device 100 includes or corresponds to a wearable device (e.g., an ear bud, a headset, a hearing aid, or any similar device) that is configured to process the audio data 104 representing one or more audio signals from the microphone(s) 102. For example, the microphone(s) 102 are configured to capture sound 170 (e.g., ambient sound) that may include speech (or another target sound) as well as noise (e.g., non-target sounds) to generate the audio data 104. The processor(s) 190 are configured to process the audio data 104 to generate an output audio signal 132 that is adjusted to provide output sound 172 having a target SNR (e.g., as indicated by settings 116) in order to improve user perception of the target sound without significant loss of situational awareness.

In FIG. 1, the processor(s) 190 include a source separator 106, a gain determiner 114, a first gain module 120, a second gain module 124, and a mixer 128. In a particular aspect, the source separator 106 is configured to perform time-domain source separation operations to generate a first signal 108 representing first components of the audio data 104 and a second signal 110 representing second components of the audio data 104. The first components include a first portion of the audio data 104 that represents speech (or other target sounds) and the second components include a second portion of the audio data 104 that represents non-speech (or other non-target) sounds. For example, the source separator 106 can include one or more machine-learning models (e.g., recurrent neural networks) that are configured and trained to perform low-latency time-domain sound source separation. As another example, the source separator 106 includes two or more time-domain filters. In this example, the source separator 106 is configured to apply first time-domain filter coefficients to generate the first signal 108 representing the first components and to apply second time-domain filter coefficients to generate the second signal 110 representing the second components.

The gain determiner 114 is configured to determine, based on a target SNR indicated by the settings 116, a first gain to apply to first components of the audio data 104 and a second gain to apply to second components of the audio data 104. In some implementations, the processor(s) 190 retrieve the settings 116 from a memory 162 accessible to the processor(s) 190. In some implementations, the settings 116 can be stored in the memory 162 based on user input received via a user interface of the device 100. In some implementations, the settings 116 can be received at the device 100 from a second device 150. For example, the device 100 can include a modem 144 coupled to the processor(s) 190. In such implementations, the device 100 can communicate, via the modem 144, with the second device 150. In some such implementations, the second device 150 can include a computing device or mobile communication device (e.g., a smart phone). For example, the second device 150 can include an application configured to present a user interface (e.g., the graphical user interface (GUI) 152) to enable a user to specify one or more parameters of the settings 116. To illustrate, in FIG. 1, the GUI 152 includes a user selectable element 154 to specify an SNR setting (e.g., the target SNR), a user selectable element 156 to specify a volume setting, a user selectable element 158 to specify a spectral tilt setting, and a user selectable element 160 to specify one or more other settings.

Optionally, the gain determiner 114 receives a signal 112 indicating the relative amplitude of the first and second signals 108, 110 from the source separator 106 and determines the first and second gains based at least in part on the signal 112. The gain determiner 114 provides a signal 140 to the first gain module 120 to cause the first gain module 120 to apply the first gain to the first components of the audio data 104 to generate a first gain adjusted signal 122 based on the first components. The gain determiner 114 also provides a signal 142 to the second gain module 124 to cause the second gain module 124 to apply the second gain to the second components of the audio data 104 to generate a second gain adjusted signal 126 based on the second components.

In a particular aspect, the gain determiner 114 selects the first gain and the second gain so as to preserve the target sound. For example, if signals 108 and 110 have the same power and the target SNR is 10 dB, the gain determiner 114 may set the first gain to 0 dB to preserve the target sound, and set the second gain to −10 dB to achieve the target SNR.

The mixer 128 is configured to combine the first gain adjusted signal 122 and the second gain adjusted signal 126 to generate the output audio signal 132. In a particular implementation, the gain determiner 114 determines the first gain and the second gain such that the output audio signal 132 has an SNR based on the target SNR. By using time-domain source separation, the processor(s) 190 are able to generate the output audio signal 132 with very low latency. For example, a delay between obtaining particular audio data and generating a corresponding output audio signal representing the particular audio data is less than one millisecond.

In some implementations, the device 100 corresponds to or is included in one of various types of devices. In an illustrative example, the processor 190 is integrated in a wearable device that includes or is coupled to the microphone(s) 102 and the speaker(s) 130. Examples of such wearable devices include, without limitation, a headset device as described further with reference to FIG. 9; a virtual reality, mixed reality, or augmented reality headset as described with reference to FIG. 10; augmented reality glasses as described with reference to FIG. 11; a hearing aid device as described with reference to FIG. 12; or earbuds as described with reference to FIG. 13.

One technical advantage of the device 100 is that the device 100 is able to generate output sound 172 with a target SNR such that target audio (e.g., speech) is emphasized without excessive loss of environmental cues associated with non-target audio. Another technical advantage of the device 100 is that the output sound 172 is generated with low latency (e.g., less than a few milliseconds, such as less than 2 milliseconds, less than 1.5 milliseconds, or less than 1 millisecond), which provides a better user experience than longer delays. In some aspects, as described further below, the source separator 106 operates in the time domain by applying filter coefficients that are based on frequency-domain processing. Such implementations have the further technical advantage of high-quality source separation without increased latency.

Figure 2:
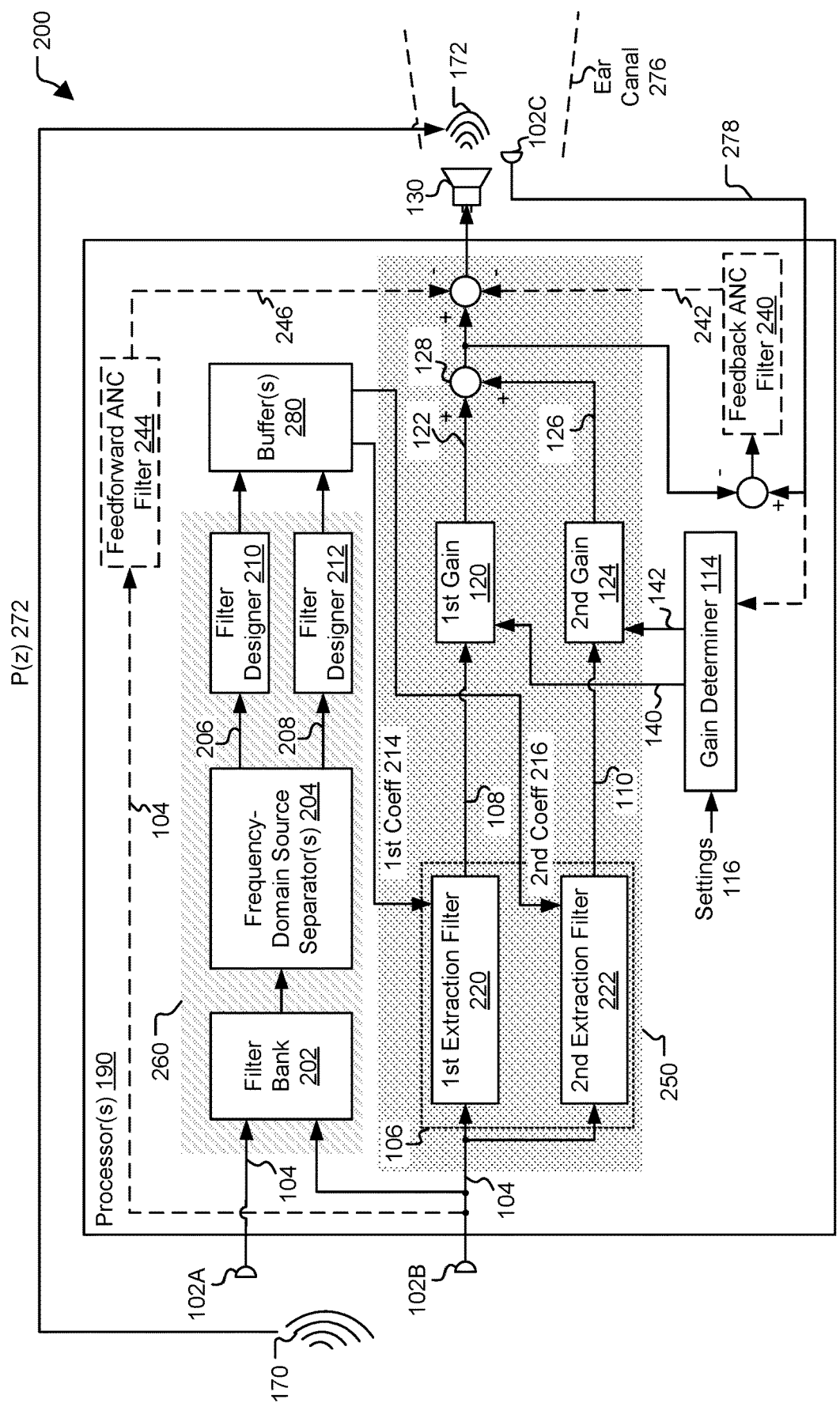
FIG. 2 is a block diagram of illustrative aspects of an example of a device of FIG. 1, which is operable to perform audio processing based on a target signal-to-noise ratio, in accordance with some examples of the present disclosure.

FIG. 2 is a block diagram of illustrative aspects of a device 200 operable to perform audio processing based on a target SNR, in accordance with some examples of the present disclosure. In a particular aspect, the device 200 is one example of an implementation of the device 100 of FIG. 1. For example, the device 200 includes the processor(s) 190 coupled to microphone(s) 102 and the speaker(s) 130 described with reference to FIG. 1. The processor(s) 190 of FIG. 2 include the source separator 106, the gain determiner 114, the first gain module 120, the second gain module 124, and the mixer 128 described with reference to FIG. 1. The device 200 includes or corresponds to a wearable device (e.g., an ear bud, a headset, a hearing aid, or any similar device) that is configured to process the audio data 104 representing one or more audio signals from the microphone(s) 102 to generate the output audio signal 132 that is adjusted to provide the output sound 172 having a target SNR (e.g., as indicated by settings 116) in order to improve user perception of the target sound without significant loss of situational awareness.

In the example illustrated in FIG. 2, the processor(s) 190 are configured to perform operations associated with two data paths, including a first data path 250 and a second data path 260. The first data path 250 is a low-latency data path, and includes the source separator 106, the first gain module 120, the second gain module 124, the mixer 128, and optionally other components or modules. In a particular aspect, operations of the first data path 250 are performed in the time domain. Accordingly, delays associated with domain transform operations are avoided in the first data path 250. In contrast, the second data path 260 is configured to provide high-quality source separation at the cost of greater latency than the first data path 250. For example, in some implementations, the first data path 250 is associated with latency of 1 millisecond or less, and the second data path 260 is associated with latency of more than 1 millisecond. As another example, in some implementations, the first data path 250 may be associated with latency of 2 milliseconds or less, and the second data path 260 is associated with latency of more than 10 milliseconds.

The second data path 260 is configured to determine filter coefficients (e.g., time-domain filter coefficients) for use by filters (e.g., a first extraction filter 220 and a second extraction filter 222) of the source separator 106. As one example, filter coefficients determined by operations of the second data path 260 are stored at one or more buffer(s) 280 and subsequently applied (in the time domain) by filters of the source separator 106.

In FIG. 2, the second data path 260 includes a filter bank 202, one or more frequency-domain source separators 204, and two or more filter designers 210, 212. In some implementations, the buffer(s) 280 are included in the filter designers 210, 212 or in another component or module of the second data path 260. In other implementations, the buffer(s) 280 are included in the extraction filters 220, 222 or in another component or module of the first data path 250.

The filter bank 202 is configured to perform one or more transform operations (e.g., fast-Fourier transforms (FFT) operations), based on samples of the audio data 104, to generate frequency-domain audio data. According to some implementations, a set of samples of the audio data 104 are accumulated for processing by the filter bank 202 (e.g., at one or more buffers of the filter bank 202), and the frequency-domain audio data for the set of samples includes information indicating the magnitude of sound within each frequency bin of a plurality of frequency bins. During or after transformation of the set of samples into the frequency domain, a subsequent set of samples of the audio data 104 is accumulated to be transformed into a subsequent set of frequency-domain audio data.

The frequency-domain source separator(s) 204 are configured to process frequency-domain audio data from the filter bank 202 to distinguish sounds from various sources, sounds of various types, or both. For example, the frequency-domain audio data generated by the filter bank 202 represents each set of samples of the audio data 104 as a set of magnitudes associated with frequency bins, and the frequency-domain source separator(s) 204 generate frequency-domain target audio data 206 indicating magnitudes of frequency bins associated with target sounds, and frequency-domain non-target audio data 208 indicating magnitudes of frequency bins associated with non-target sounds. In some implementations, the target sounds include speech sounds, and the non-target sounds include non-speech sounds. In other implementations, the target sounds include music, speech sounds from a particular person, sounds from a particular direction, etc. In such implementations, the non-target sounds include noise, non-speech ambient sounds, speech from persons other than a target speaker, sounds from directions other than the target direction, etc. Although FIG. 2 illustrates the frequency-domain source separator(s) 204 generating two outputs corresponding to the frequency-domain target audio data 206 and the frequency-domain non-target audio data 208, in other implementations, the frequency-domain source separator(s) 204 generate more than two outputs, such as outputs representing multiple distinct target sounds (e.g., speech from two distinct speakers), outputs representing multiple distinct non-target sounds (e.g., crowd noise, traffic noise, and animal sounds), or both.

In some implementations, the frequency-domain source separator 204 includes one or more machine-learning models trained to distinguish among various sound sources or sound types. To illustrate, frequency-domain source separator 204 can include one or more recurrent neural networks (such as neural network(s) including one or more long-short term memory layers, one or more gated recurrent units, or other recurrent structures) trained to distinguish target sounds from non-target sounds. In the same or different implementations, the frequency-domain source separator(s) 204 can include one or more beamformers to distinguish target sounds from one or more directions from non-target sounds from other directions. In the same or different implementations, the frequency-domain source separator(s) 204 can perform operations to distinguish target sounds from non-target sounds based on statistical properties of the sounds (e.g., using blind source separation techniques and/or speech augmentation techniques).

In some implementations, the frequency-domain source separator(s) 204 are configured to use two or more techniques to determine the frequency-domain target audio data 206 and the frequency-domain non-target audio data 208. For example, the frequency-domain source separator(s) 204 can include one or more beamformers that are configured to process the frequency-domain audio data from the filter bank 202 to distinguish sounds from different directions. In this example, the beamformer(s) generate directional data (e.g., directional frequency-domain audio data or directional data associated with the frequency-domain audio data from the filter bank 202) and provide the directional data as input to one or more machine-learning models or other source separators to generate the frequency-domain target audio data 206 and the frequency-domain non-target audio data 208. In this example, the frequency-domain target audio data 206 and the frequency-domain non-target audio data 208 can be distinguished based on both sound type and source direction. As another example, the frequency-domain source separator(s) 204 can include one or more speech augmentation engines configured to process the frequency-domain audio data from the filter bank 202 to augment speech sounds. In this example, speech-augmented audio data from the speech augmentation engine(s) can be provided as input to one or more machine-learning models or other source separators to generate the frequency-domain target audio data 206 and the frequency-domain non-target audio data 208.

In the examples above, beamforming and speech augmentation are described as examples of pre-processing operations that can be performed before another process or technique (e.g., blind source separation, one or more machine-learning models, etc.) is used to generate the frequency-domain target audio data 206 and the frequency-domain non-target audio data 208. In addition to, or instead of, such pre-processing operations, the frequency-domain source separator(s) 204 can be configured to perform post-processing operations to generate the frequency-domain target audio data 206 and the frequency-domain non-target audio data 208. For example, the frequency-domain source separator(s) 204 can include a machine-learning model (sometimes referred to as an "inline" model) that is trained to generate output audio data representing the target sounds. In this example, the output of the machine-learning model includes the frequency-domain target audio data 206 and post-processing operations can be performed to remove the frequency-domain target audio data 206 from the frequency-domain audio data from the filter bank 202 to generate the frequency-domain non-target audio data 208. In an alternative example, the frequency-domain source separator(s) 204 can include a machine-learning model (sometimes referred to as a "masking" model) that is trained to generate output audio data representing the non-target sounds. In this example, the output of the machine-learning model includes the frequency-domain non-target audio data 208 and post-processing operations can be performed to remove the frequency-domain non-target audio data 208 from the frequency-domain audio data from the filter bank 202 to generate the frequency-domain target audio data 206.

Each of the filter designers 210, 212 is configured to generate the time-domain filter coefficients based on frequency-domain audio data. For example, the filter designer 210 is configured to generate first coefficients 214 based on the frequency-domain target audio data 206, and the filter designer 212 is configured to generate second coefficients 216 based on the frequency-domain non-target audio data 208. Although the filter designers 210, 212 are illustrated as separate components in FIG. 2, in some implementations, the device 200 can include a single filter designer that processes the frequency-domain target audio data 206 to generate the first coefficients 214 and processes the frequency-domain non-target audio data 208 to generate the second coefficients 216. For example, the single filter designer can generate the first coefficients 214 based on the frequency-domain target audio data 206 and subsequently generate the second coefficients 216 for the frequency-domain non-target audio data 208 associated with the frequency-domain target audio data 206. To illustrate, when the frequency domain source separator(s) 204 include post-processing operations to generate the frequency-domain non-target audio data 208 based on the frequency-domain target audio data 206, the frequency-domain target audio data 206 can be provided to the single filter designer in parallel with providing the frequency-domain target audio data 206 to the post-processing operations. In this example, the post-processing operations generate the frequency-domain non-target audio data 208 while the single filter designer generates the first coefficients 214, and when the post-processing operations are complete, the frequency-domain non-target audio data 208 generated by the post-processing operations are provided to the single filter designer to generate the second coefficients 216.

In a particular aspect, each of the filter designers 210, 212 is configured to perform one or more reverse transform operations using frequency-domain audio data (e.g., the frequency-domain target audio data 206 and the frequency-domain non-target audio data 208, respectively, in the example illustrated in FIG. 2) to generate time-domain filter coefficients. The filter designers 210, 212 can be configured to generate the coefficients 214, 216 as real-valued masks or as complex-valued masks. Examples of real-valued masks that can be generated by the filter designers 210, 212 in some implementations include linear phase finite impulse response (FIR) filter coefficients, minimum phase FIR filter coefficients, autoregressive filter coefficients, infinite impulse response (IIR) filter coefficients, all-pole filter coefficients, etc. Complex-valued masks can include FIR or IIR filters indicating magnitude and phase. A technical benefit of using linear phase FIR filter coefficients is predictable delay because the delay associated with applying the linear phase FIR filter coefficients is entirely dependent on the length of the FIR filter. A technical benefit of using minimum phase FIR filter coefficients or autoregressive filter coefficients is decreased delay because, while the delay introduced by application of such filter coefficients is frequency dependent, the delay is the minimum possible for the particular input data.

The extraction filters 220, 222 are updated periodically or occasionally (e.g., when updated coefficients 214, 216 become available). In this arrangement, the extraction filters 220, 222 apply time-domain filter coefficients (e.g., the coefficients 214, 216) to audio data 104 that is newer than the audio data 104 used to generate the coefficients 214, 216. As one non-limiting example, the operations of the second data path 260 may be performed over a period of about 16 milliseconds; whereas the operations of the first data path 250 may be performed over a period of about 1 millisecond. Thus, in this specific example, the time-domain filter coefficients applied to a particular data sample in the first data path 250 are always at least 16 milliseconds older than the data sample. Except in unusual circumstances, ambient noise typically changes slowly enough that even with such a delay, the time-domain filter coefficients are sufficiently representative to provide reliable sound separation.

During operation, the microphone(s) 102 generate the signals based on the sound 170. The signals can include digital signals (e.g., the audio data 104) or analog signals which are processed (e.g., at coder/decoder (CODEC)) to generate the audio data 104. The sound 170 can include speech or other target sounds as well as non-target sounds, such as noise. The audio data 104 representing sound 170 is provided to the first data path 250 for low-latency processing, and to the second data path 260 for frequency-domain processing to generate or update time-domain filter coefficients for use by the extraction filters 220, 222.

In the first data path 250, the audio data 104 is processed by the first extraction filter 220 to generate the first signal 108 representing first components of the audio data 104, where the first components represent speech (or other target sounds). For example the first extraction filter 220 applies a first set of time-domain filter coefficients to the audio data 104. The first set of time-domain filter coefficients correspond to first coefficients 214 previously generated by the second data path 260 after processing of a prior set of audio data 104. The first signal 108 is provided to the first gain module 120, which applies a first gain to the first signal 108 to generate the first gain adjusted signal 122. The first gain applied by the first gain module 120 is based on the signal 140 from the gain determiner 114.

Additionally, in the first data path 250, the audio data 104 is processed by the second extraction filter 222 to generate the second signal 110 representing second components of the audio data 104, where the second components represent noise (or other non-target sounds). For example the second extraction filter 222 applies a second set of time-domain filter coefficients to the audio data 104. The second set of time-domain filter coefficients correspond to second coefficients 216 previously generated by the second data path 260 after processing of a prior set of audio data 104. The second signal 110 is provided to the second gain module 124, which applies a second gain to the second signal 110 to generate the second gain adjusted signal 126. The second gain applied by the second gain module 124 is based on the signal 142 from the gain determiner 114.

The gain determiner 114 determines the signal 140 and the signal 142 based on the settings 116. For example, settings 116 can specify or be used to determine the target SNR, and the gain determiner 114 can determine the signals 140, 142 such that an SNR of the output sound 172 substantially (e.g., within operational tolerances of the device 100) matches the target SNR. Optionally, in some implementations, the gain determiner 114 bases the signals 140, 142 at least in part on the signal 112 (shown in FIG. 1). For example, the signal 112 can indicate an estimate of the SNR of the audio data, which the gain determiner 114 can use to determine gains to be applied to the target and non-target sounds to generate output sound 172 having the target SNR. In the same or different implementations, the gain determiner 114 can optionally receive a feedback signal 278 from a microphone 102C disposed proximate the speaker(s) 130. In such implementations, the gain determiner 114 can use the feedback signal 278 to estimate the SNR of the output sound 172 and determine gains to be applied to the target and non-target sounds to adjust the SNR of the output sound 172 toward the target SNR.

The mixer 128 mixes the first gain adjusted signal 122 and the second gain adjusted signal 126. In some implementations, output of the mixer 128 is used to drive the speaker(s) 130 to generate the output sound 172. Optionally, in some implementations, the device 200 includes a feedback adaptive noise cancellation (ANC) filter 240. In such implementations, the feedback ANC filter 240 is configured to receive the feedback signal 278 which can include audio data representing the output sound 172 as well as portions of the sound 170 as modified by a transfer function (P(z)) 272. For example, the transfer function 272 can be due to partial or complete occlusion of an ear canal 276 of the user by a portion of the device 200. For example, the device 200 can include an earcup, an eartip, or another structure that at least partially blocks or occludes the ear canal 276. In this situation, a portion of the sound 170 that reaches the ear canal 276 can be modified as a result of passing through the earcup, eartip, or other structure, resulting in unnatural sound (e.g., due to attenuation of some frequencies more than other frequencies). The feedback signal 278 represents user perceivable sounds, which can include the output sound 172 and the sound 170 as modified by the transfer function 272. The feedback ANC filter 240 generates a feedback ANC signal 242, which is used to modify the output of the mixer 128 to account for the portion of the sound 170 that is detectable to the user. For example, the portion of the sound 170 that is represented in the feedback signal 278 can be subtracted from the output of the mixer 128.

Optionally, in some implementations, the device 200 also or alternatively includes a feedforward ANC filter 244. In such implementations, the feedforward ANC filter 244 is configured to receive the audio data 104 and generate a feedfoward ANC signal 246, which is used to modify the output of the mixer 128 to account for noise in the sound 170. For example, in some situations, the target audio includes speech and the non-target audio includes non-speech sounds. In such situations, the device 200 seeks to adjust the gain applied to the non-speech sounds in a manner that results in the output sound 172 having the target SNR so that important audio information is not entirely eliminated in order to improve user perception of speech. However, certain sounds (such as, hiss due to wind noise) are unlikely to carry audio information that provides any important environmental cues. Complete removal of such sounds (e.g., pure noise) can result in a better user experience; therefore, such sounds can be entirely or substantially removed from the output sound. Although FIG. 2 illustrates the feedforward ANC signal 246 being used to modify output of the mixer 128, in other implementations, the feedforward ANC signal 246 can be used to modify the audio data 104 provided to the first data path 250, the second data path 260, or both.

In the second data path 260, a set of samples of the audio data 104 are accumulated and subjected to one or more transform operations by the filter bank 202 to generate frequency-domain audio data representing the set of samples. In some implementations, the frequency-domain audio data is processed by the frequency-domain source separator(s) 204 to generate the frequency-domain target audio data 206 (which includes target audio components of the frequency-domain audio data and omits or suppresses non-target audio components of the frequency-domain audio data) and the frequency-domain non-target audio data 208 (which includes non-target audio components of the frequency-domain audio data and omits or suppresses target audio components of the frequency-domain audio data).

The frequency-domain target audio data 206 is provided as input to the filter designer 210, which performs inverse transform operations and parameterization operations to generate the first coefficients 214. The specific inverse transform operations and parameterization operations performed can be different for different implementations. As an example, the inverse transform operations can include various inverse Fourier transform operations, such as inverse fast-Fourier transform (IFFT) operations. The parametrization operations can include, for example, windowing or shifting time-domain data generated by the inverse transform operations to generate a specific number of time-domain filter coefficients based, for example, on a number of filter coefficients applied by the first extraction filter 220. Applying a larger number of filter coefficients can provide greater noise suppression at the cost of greater computational complexity.

Similarly, the frequency-domain non-target audio data 208 is provided as input to the filter designer 212, which performs inverse transform operations and parameterization operations to generate the second coefficients 216. The specific inverse transform operations and parameterization operations performed can be different for different implementations. Further, the inverse transform operations and parameterization operations performed by the filter designer 210 can differ from the inverse transform operations and parameterization operations performed by the filter designer 212. To illustrate, the first extraction filter 220 can be more complex than the second extraction filter 222 (and therefore may use more filter coefficients) to improve extraction of the target audio data.

While first and second coefficients 214, 216 based on a first set of samples of the audio data 104 are being generated, additional samples of the audio data 104 can be received and aggregated to form a second set of samples of the audio data. After the second set of samples is collected, the second set of samples is subjected to the same operations described above to update the first and second coefficients 214, 216.

Figure 3:
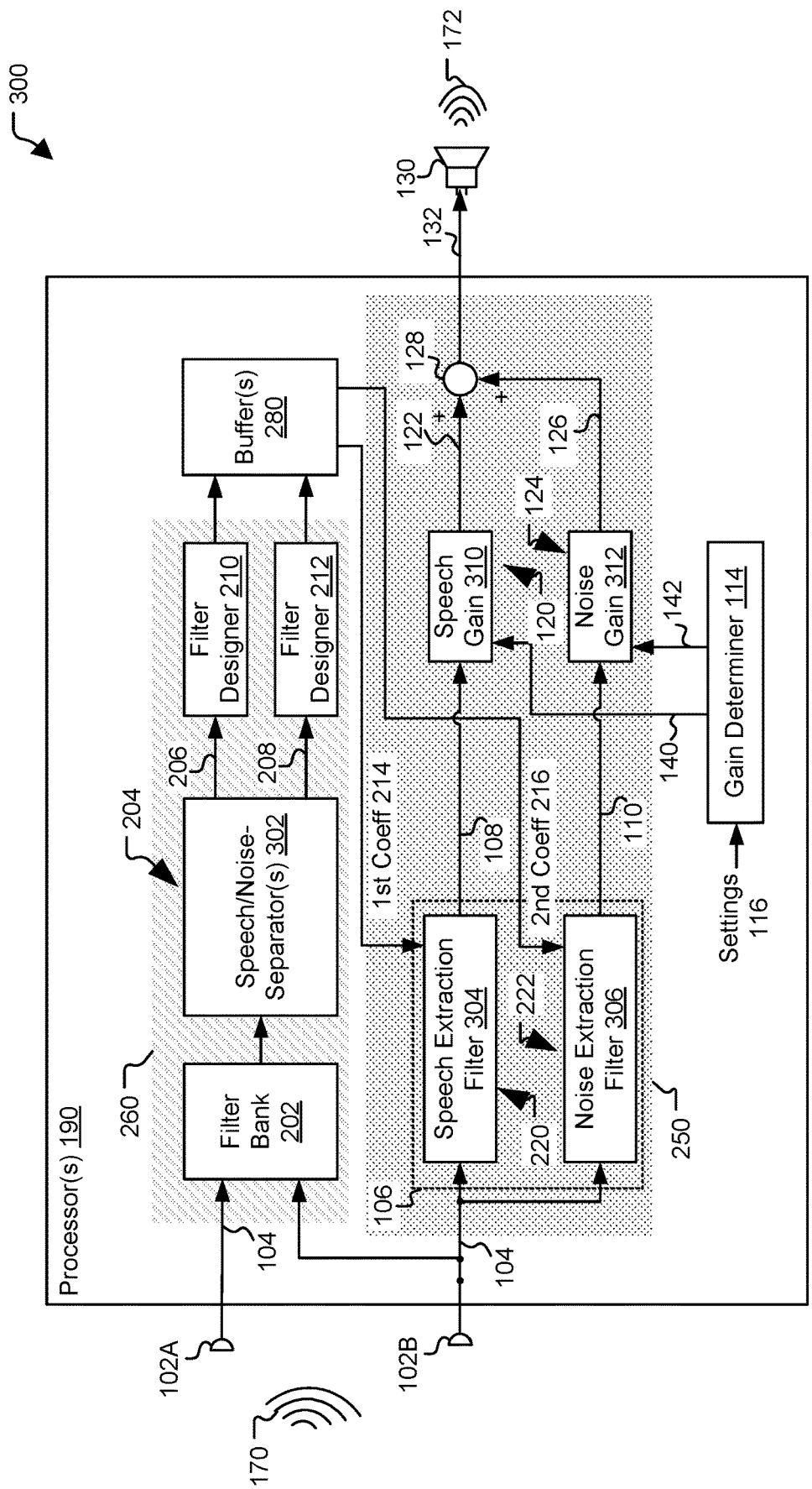
FIG. 3 is a block diagram of illustrative aspects of the device of FIG. 1, which is operable to perform audio processing based on a target signal-to-noise ratio, in accordance with some examples of the present disclosure.

FIG. 3 is a block diagram of illustrative aspects of the device of FIG. 1, which is operable to perform audio processing based on a target SNR, in accordance with some examples of the present disclosure. The device 300 of FIG. 3 represents one particular, non-limiting, example of the device 200 of FIG. 2 (which is itself a non-limiting example of the device 100 of FIG. 1), as such, the device 300 of FIG. 3 includes many of the same components as illustrated and described with reference to FIGS. 1 and 2, each of which operates as described above. For example, the device 300 includes the processor(s) 190 coupled to the microphone(s) 102 and the speaker(s) 130 as described with reference to FIG. 1. Additionally, the processor(s) 190 of FIG. 3 include the source separator 106, the gain determiner 114, the first gain module 120, the second gain module 124, and the mixer 128 described with reference to FIG. 1. Further, in FIG. 3, the source separator 106, the first gain module 120, the second gain module 124, and the mixer 128 are associated with the first data path 250 (e.g., a low-latency, time-domain data path) as described with reference to FIG. 2. The device 300 of FIG. 3 also includes the filter bank 202, the frequency-domain source separator(s) 204, and the filter designers 210, 212 in the second data path 260 (e.g., a frequency domain data path) as described with reference to FIG. 2. Although not shown in FIG. 3, the device 300 can also include optional features of FIG. 1 or FIG. 2, such as the signal 112 of FIG. 1, the feedforward ANC filter 244 of FIG. 2, the feedback ANC filter 240 of FIG. 2, or a combination thereof.

In the example illustrated in FIG. 3, the target audio includes speech and the non-target audio includes noise. Accordingly, in FIG. 3, the frequency-domain source separator(s) 204 include one or more speech/noise separators 302. For example, the speech/noise separator(s) 302 can include one or more machine-learning models that are trained to distinguish speech and noise (or speech and non-speech) sounds in frequency domain audio data. As another example, the speech/noise separator(s) 302 can include one or more machine-learning models that are trained to generate (e.g., reconstruct) speech data based on input frequency domain audio data, and one or more spectral subtraction components to generate non-speech components based on the reconstructed speech data and the input frequency domain audio data. Other frequency-domain speech/noise separation techniques can also, or alternatively, be implemented by the speech/noise separator(s) 302.

In the example illustrated in FIG. 3, the frequency-domain target audio data 206 includes a frequency-domain representation of speech in the sound 170, and the frequency-domain non-target audio data 208 includes a frequency-domain representation of non-speech (e.g., noise) components of the sound 170. The filter designer 210 generates the first coefficients 214 to enable the first extraction filter 220 to extract speech components of the audio data 104 in the time domain to generate the first signal 108. Thus, the first extraction filter 220 in FIG. 3 is a speech extraction filter 304. Similarly, the filter designer 212 generates the second coefficients 216 to enable the second extraction filter 222 to extract non-speech (e.g., noise) components of the audio data 104 in the time domain to generate the second signal 110. Thus, the second extraction filter 222 in FIG. 3 is a noise extraction filter 306.

In FIG. 3, the first signal 108, representing speech components of the audio data 104, is provided to the first gain module 120, which in FIG. 3 is a speech gain module 310. The speech gain module 310 applies a first gain (e.g., a speech gain) to the first signal 108 to generate the first gain adjusted signal 122 (e.g., a gain adjusted speech signal). The speech gain applied by the speech gain module 310 is based on the signal 140 from the gain determiner 114.

Similarly, in FIG. 3, the second signal 110, representing non-speech (e.g., noise) components of the audio data 104, is provided to the second gain module 120, which in FIG. 3 is a noise gain module 312. The noise gain module 312 applies a second gain (e.g., a noise gain) to the second signal 110 to generate the second gain adjusted signal 126 (e.g., a gain adjusted noise signal). The noise gain applied by the noise gain module 312 is based on the signal 142 from the gain determiner 114. In FIG. 3, the mixer 128 mixes the gain adjusted speech signal and the gain adjusted noise signal to generate the output audio signal 132 that is adjusted to provide output sound 172 having the target SNR (e.g., as indicated by settings 116) in order to improve user perception of speech without significant loss of situational awareness.

Figure 4:
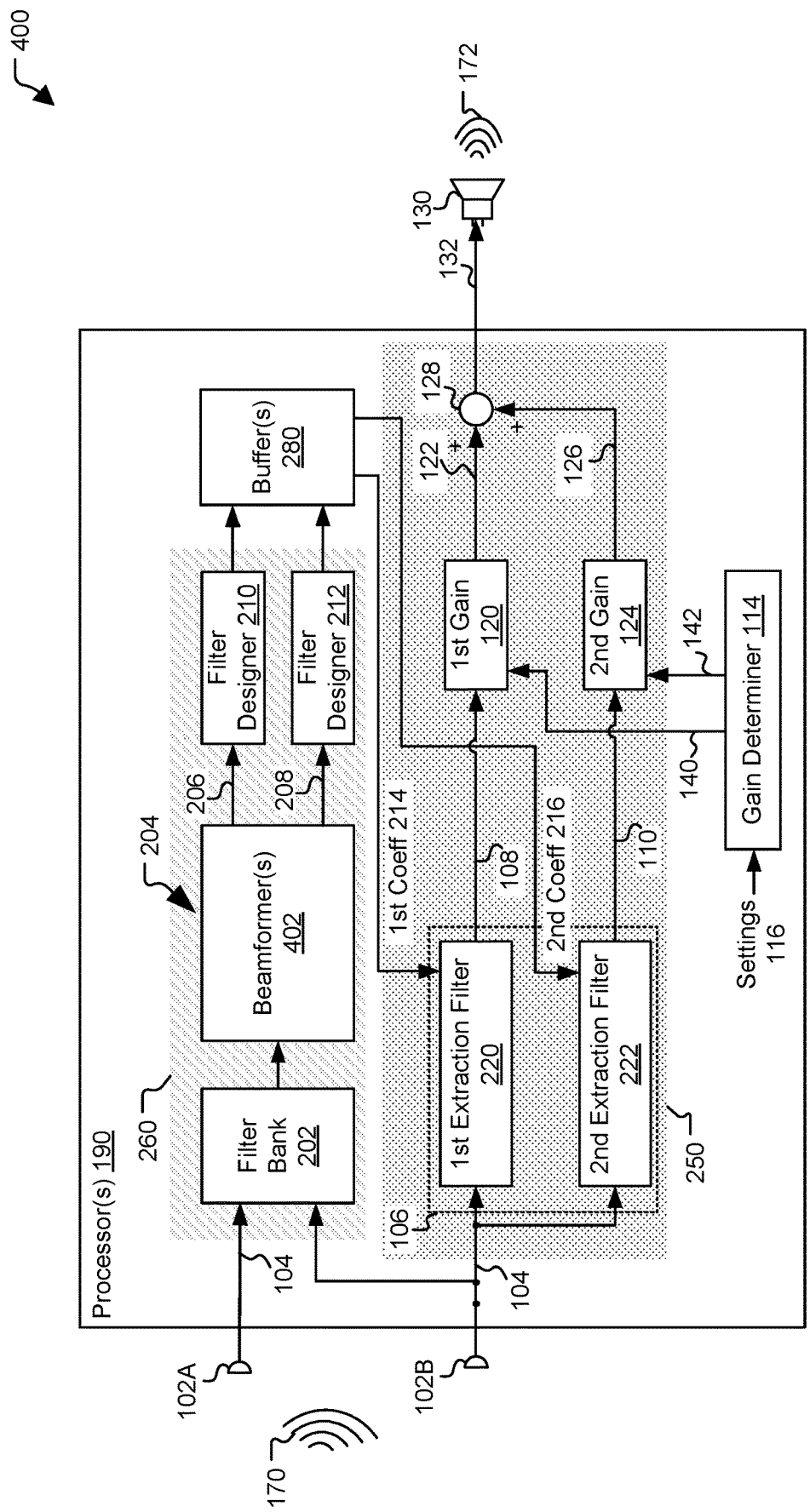
FIG. 4 is a block diagram of illustrative aspects of the device of FIG. 1, which is operable to perform audio processing based on a target signal-to-noise ratio, in accordance with some examples of the present disclosure.

FIG. 4 is a block diagram of illustrative aspects of the device of FIG. 1, which is operable to perform audio processing based on a target SNR, in accordance with some examples of the present disclosure. The device 400 of FIG. 4 represents one particular, non-limiting, example of the device 200 of FIG. 2 (which is a non-limiting example of the device 100 of FIG. 1), as such, the device 400 of FIG. 4 includes many of the same components as illustrated and described with reference to FIGS. 1 and 2, each of which operates as described above. For example, the device 400 includes the processor(s) 190 coupled to the microphone(s) 102 and the speaker(s) 130 as described with reference to FIG. 1. Additionally, the processor(s) 190 of FIG. 4 include the source separator 106, the gain determiner 114, the first gain module 120, the second gain module 124, and the mixer 128 described with reference to FIG. 1. Further, in FIG. 4, the source separator 106, the first gain module 120, the second gain module 124, and the mixer 128 are associated with the first data path 250 (e.g., a low-latency, time-domain data path) as described with reference to FIG. 2. The device 400 of FIG. 4 also includes the filter bank 202, the frequency-domain source separator(s) 204, and the filter designers 210, 212 in the second data path 260 (e.g., a frequency domain data path) as described with reference to FIG. 2. Although not shown in FIG. 4, the device 400 can also include optional features of FIG. 1 or FIG. 2, such as the signal 112 of FIG. 1, the feedforward ANC filter 244 of FIG. 2, the feedback ANC filter 240 of FIG. 2, or a combination thereof.

In the example illustrated in FIG. 4, the frequency-domain source separator(s) 204 include one or more beamformers 402 (e.g., one or more minimum variance distortionless response (MVDR) beamformers). In this example, the target sound corresponds to portions of the sound 170 originating from a particular direction (e.g., a target direction) relative to a user of the device 400. To illustrate, as explained above, the device 400 can be a wearable device, such as a hearing aid, earbuds, headset, etc.), and the target sound can include sound originating from a direction that the user is facing.

In FIG. 4, the frequency-domain target audio data 206 includes a frequency-domain representation of sound from a target direction, and the frequency-domain non-target audio data 208 includes a frequency-domain representation of components of the sound 170 from one or more other directions. The filter designer 210 generates the first coefficients 214 to enable the first extraction filter 220 to extract, in the time domain, components of the audio data 104 originating from the target direction to generate the first signal 108. Similarly, the filter designer 212 generates the second coefficients 216 to enable the second extraction filter 222 to extract, in the time domain, components of the audio data 104 originating from directions other than the target direction. The first and second gain modules 120, 124, the mixer 128, and the gain determiner 114 operate with respect to the first and second signals 108, 110, as described above, to generate the output audio signal 132 that is adjusted to provide output sound 172 having the target SNR (e.g., as indicated by settings 116) in order to improve user perception of sound from the target direction without significant loss of situational awareness.

Figure 5:
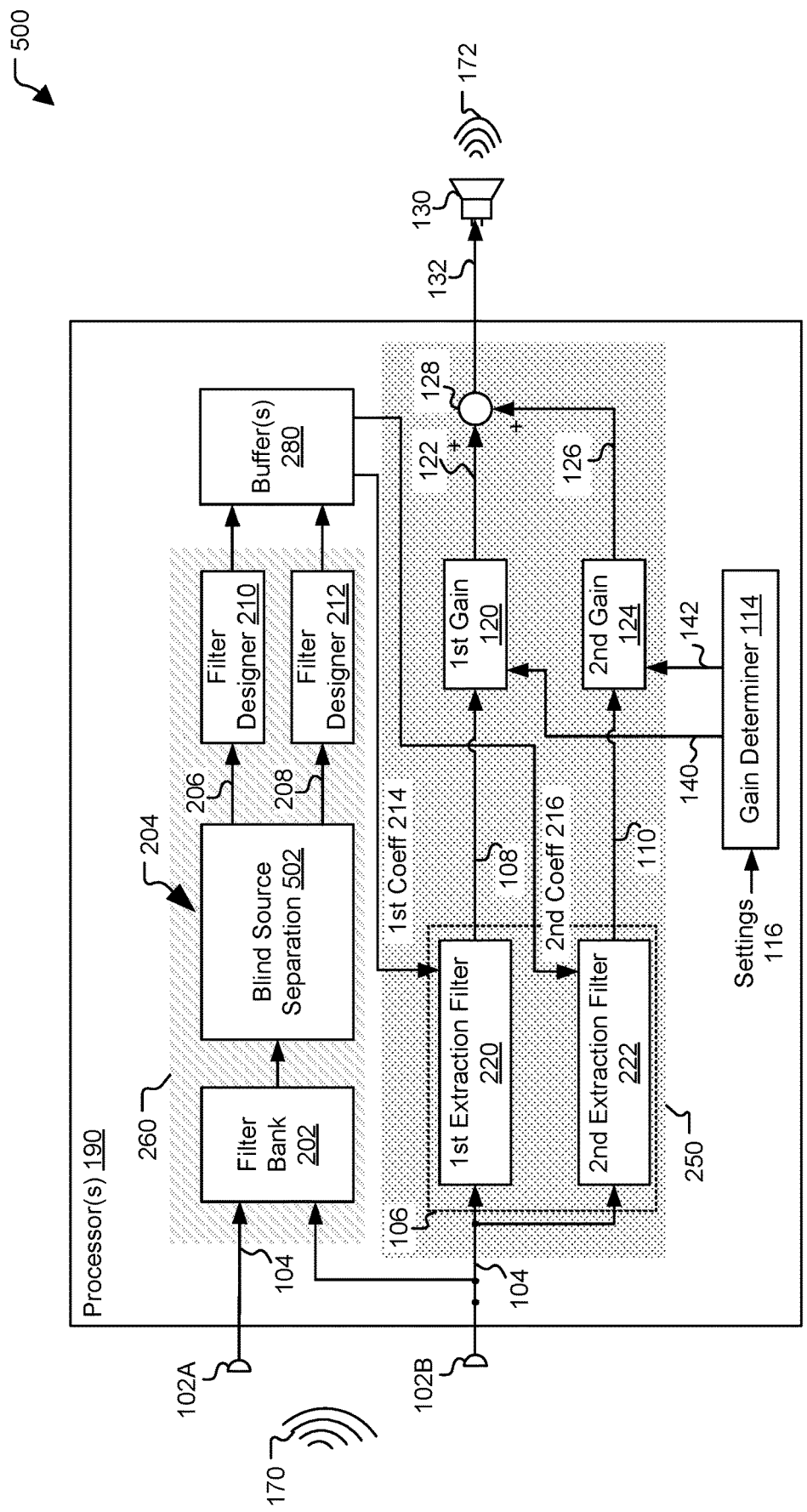
FIG. 5 is a block diagram of illustrative aspects of the device of FIG. 1, which is operable to perform audio processing based on a target signal-to-noise ratio, in accordance with some examples of the present disclosure.

FIG. 5 is a block diagram of illustrative aspects of the device of FIG. 1, which is operable to perform audio processing based on a target SNR, in accordance with some examples of the present disclosure. The device 500 of FIG. 5 represents one particular, non-limiting, example of the device 200 of FIG. 2 (which is a non-limiting example of the device 100 of FIG. 1), as such, the device 500 of FIG. 5 includes many of the same components as illustrated and described with reference to FIGS. 1 and 2, each of which operates as described above. For example, the device 500 includes the processor(s) 190 coupled to the microphone(s) 102 and the speaker(s) 130 as described with reference to FIG. 1. Additionally, the processor(s) 190 of FIG. 5 include the source separator 106, the gain determiner 114, the first gain module 120, the second gain module 124, and the mixer 128 described with reference to FIG. 1. Further, in FIG. 5, the source separator 106, the first gain module 120, the second gain module 124, and the mixer 128 are associated with the first data path 250 (e.g., a low-latency, time-domain data path) as described with reference to FIG. 2. The device 500 of FIG. 5 also includes the filter bank 202, the frequency-domain source separator(s) 204, and the filter designers 210, 212 in the second data path 260 (e.g., a frequency domain data path) as described with reference to FIG. 2. Although not shown in FIG. 5, the device 500 can also include optional features of FIG. 1 or FIG. 2, such as the signal 112 of FIG. 1, the feedforward ANC filter 244 of FIG. 2, the feedback ANC filter 240 of FIG. 2, or a combination thereof.

In the example illustrated in FIG. 5, the frequency-domain source separator(s) 204 include a blind source separation module 502. The blind source separation module 502 is operable to distinguish portions of the sound 170 from different sources based on statistical characteristics of sound from the different sources. In this example, the target sound corresponds to a portion of the sound 170 having particular characteristics or a portion of the sound from a dominant sound source. To illustrate, the blind source separation module 502 can distinguish portions of the sound 170 from different sources based on statistical characteristics of the sound 170 and designate sound from sound source and that has a particular direction of arrival at the device 500 as the target sound.

In FIG. 5, the frequency-domain target audio data 206 includes a frequency-domain representation of target sound, and the frequency-domain non-target audio data 208 includes a frequency-domain representation of other components of the sound 170. The filter designer 210 generates the first coefficients 214 to enable the first extraction filter 220 to extract the target sounds in the time domain, and the filter designer 212 generates the second coefficients 216 to enable the second extraction filter 222 to extract the non-target sounds in the time domain. The first and second gain modules 120, 124, the mixer 128, and the gain determiner 114 operate with respect to the first and second signals 108, 110, as described above, to generate the output audio signal 132 that is adjusted to provide output sound 172 having the target SNR (e.g., as indicated by settings 116) in order to improve user perception of the target sound without significant loss of situational awareness.

Figure 6:
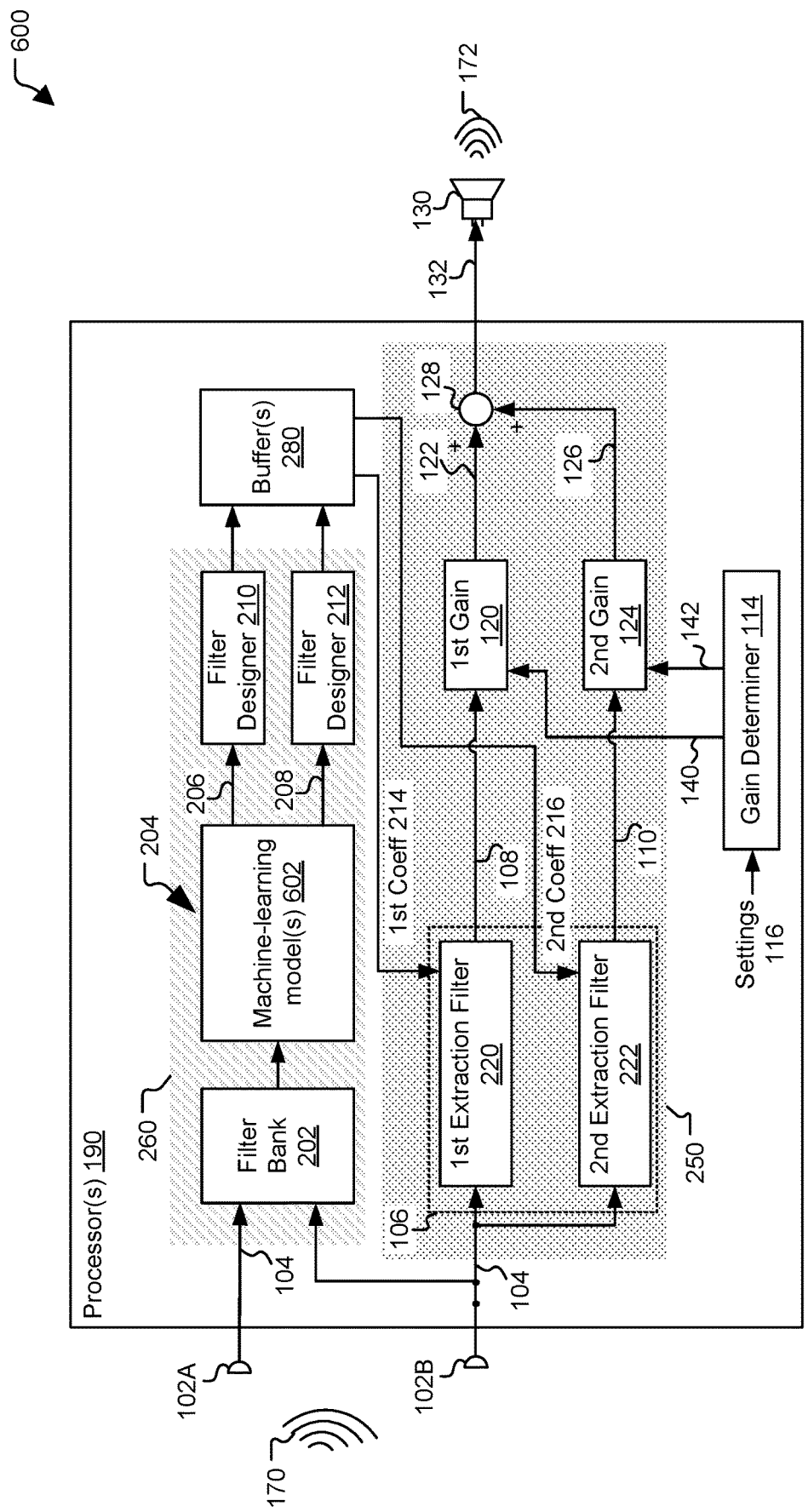
FIG. 6 is a block diagram of illustrative aspects of the device of FIG. 1, which is operable to perform audio processing based on a target signal-to-noise ratio, in accordance with some examples of the present disclosure.

FIG. 6 is a block diagram of illustrative aspects of the device of FIG. 1, which is operable to perform audio processing based on a target SNR, in accordance with some examples of the present disclosure. The device 600 of FIG. 6 represents one particular, non-limiting, example of the device 200 of FIG. 2 (which is a non-limiting example of the device 100 of FIG. 1), as such, the device 600 of FIG. 6 includes many of the same components as illustrated and described with reference to FIGS. 1 and 2, each of which operates as described above. For example, the device 600 includes the processor(s) 190 coupled to the microphone(s) 102 and the speaker(s) 130 as described with reference to FIG. 1. Additionally, the processor(s) 190 of FIG. 6 include the source separator 106, the gain determiner 114, the first gain module 120, the second gain module 124, and the mixer 128 described with reference to FIG. 1. Further, in FIG. 6, the source separator 106, the first gain module 120, the second gain module 124, and the mixer 128 are associated with the first data path 250 (e.g., a low-latency, time-domain data path) as described with reference to FIG. 2. The device 600 of FIG. 6 also includes the filter bank 202, the frequency-domain source separator(s) 204, and the filter designers 210, 212 in the second data path 260 (e.g., a frequency domain data path) as described with reference to FIG. 2. Although not shown in FIG. 6, the device 600 can also include optional features of FIG. 1 or FIG. 2, such as the signal 112 of FIG. 1, the feedforward ANC filter 244 of FIG. 2, the feedback ANC filter 240 of FIG. 2, or a combination thereof.

In the example illustrated in FIG. 6, the frequency-domain source separator(s) 204 include one or more machine-learning models 602. Depending on the specific type(s) of machine-learning models 602 used and how the machine-learning models 602 are trained, the machine-learning models 602 can distinguish components of the sound 170 based on direction, source, types of sound (e.g., speech, music, crowd noise, vehicle sounds, etc.), or combinations thereof. Thus, when the frequency-domain source separator(s) 204 include machine-learning model(s) 602 the nature of the target sound is implementation specific. As such, using machine-learning model(s) 602 as the frequency-domain source separator(s) 204 enables selection of a greater variety of target sounds than many other source separation techniques.

In FIG. 6, the frequency-domain target audio data 206 includes a frequency-domain representation of target sound, and the frequency-domain non-target audio data 208 includes a frequency-domain representation of other components of the sound 170. The filter designer 210 generates the first coefficients 214 to enable the first extraction filter 220 to extract the target sounds in the time domain, and the filter designer 212 generates the second coefficients 216 to enable the second extraction filter 222 to extract the non-target sounds in the time domain. The first and second gain modules 120, 124, the mixer 128, and the gain determiner 114 operate with respect to the first and second signals 108, 110, as described above, to generate the output audio signal 132 that is adjusted to provide output sound 172 having the target SNR (e.g., as indicated by settings 116) in order to improve user perception of the target sound without significant loss of situational awareness.

Figure 7:
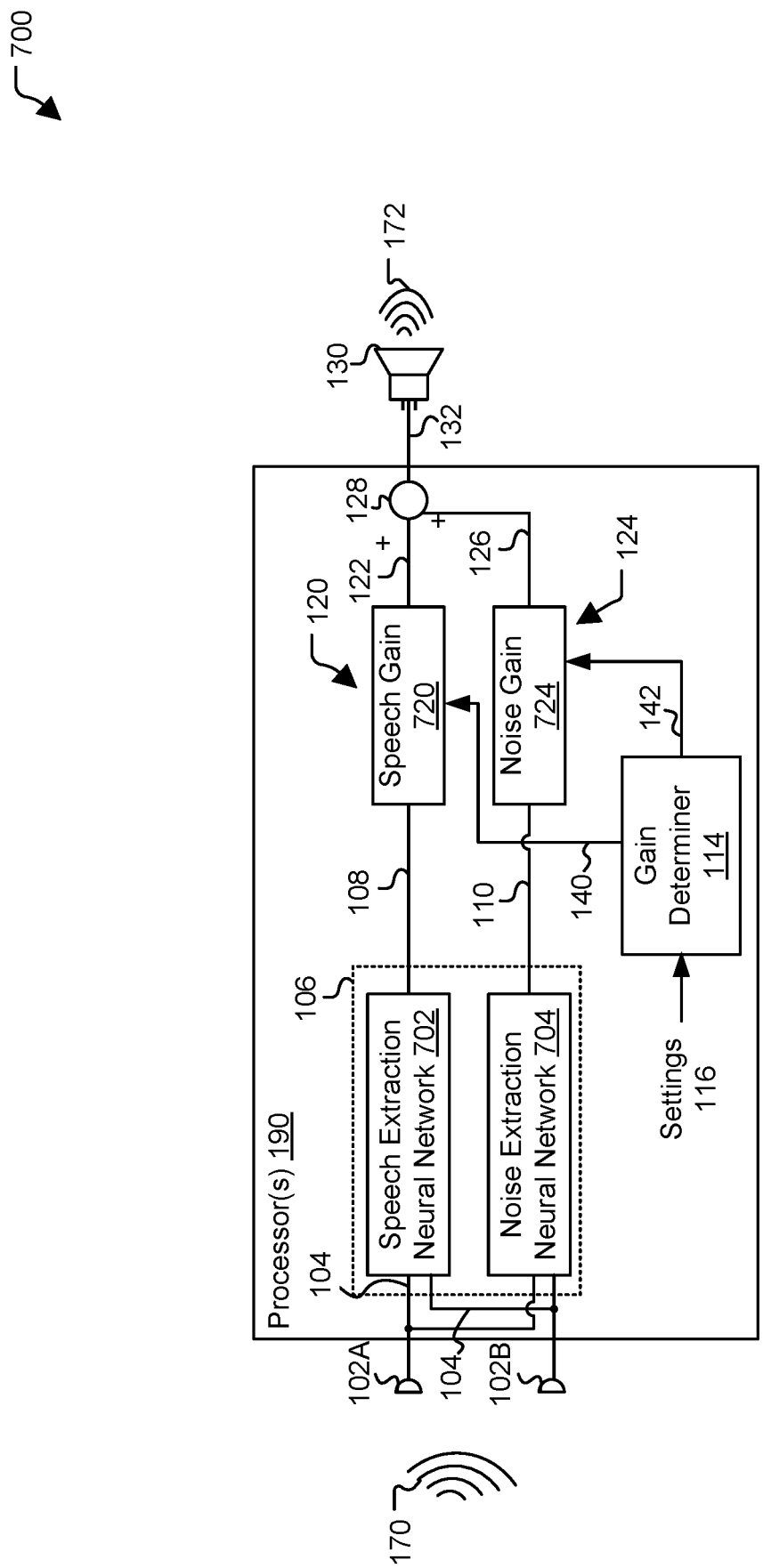
FIG. 7 is a block diagram of illustrative aspects of the device of FIG. 1, which is operable to perform audio processing based on a target signal-to-noise ratio, in accordance with some examples of the present disclosure.

FIG. 7 is a block diagram of illustrative aspects of the device of FIG. 1, which is operable to perform audio processing based on a target SNR, in accordance with some examples of the present disclosure. The device 700 of FIG. 7 represents one particular, non-limiting, example of the device 100 of FIG. 1, as such, the device 700 of FIG. 7 includes many of the same components as illustrated and described with reference to FIG. 1, each of which operates as described above. For example, the device 700 includes the processor(s) 190 coupled to the microphone(s) 102 and the speaker(s) 130 as described with reference to FIG. 1. Additionally, the processor(s) 190 of FIG. 7 include the source separator 106, the gain determiner 114, the first gain module 120, the second gain module 124, and the mixer 128 described with reference to FIG. 1.

In FIG. 7, the source separator 106 includes a speech extraction neural network 702 and a noise extraction neural network 704. The speech extraction neural network 702 and the noise extraction neural network 704 of FIG. 7 operate in the time domain. For example, the speech extraction neural network 702 and the noise extraction neural network 704 each process the audio data 104 in the time domain. To limit latency introduced by the source separator 106, the speech extraction neural network 702 and the noise extraction neural network 704 are low-latency neural networks.

In the example illustrated in FIG. 7, the target audio includes speech and the non-target audio includes noise. Thus, the first signal 108 represents speech components of the audio data 104, and the second signal 110 represents noise components of the audio data 104.

The first signal 108 is provided to the first gain module 120, which in FIG. 7 is a speech gain module 720. The speech gain module 720 applies a first gain (e.g., a speech gain) to the first signal 108 to generate the first gain adjusted signal 122 (e.g., a gain adjusted speech signal). The speech gain applied by the speech gain module 720 is based on the signal 140 from the gain determiner 114.

The second signal 110 is provided to the second gain module 120, which in FIG. 7 is a noise gain module 724. The noise gain module 724 applies a second gain (e.g., a noise gain) to the second signal 110 to generate the second gain adjusted signal 126 (e.g., a gain adjusted noise signal). The noise gain applied by the noise gain module 724 is based on the signal 142 from the gain determiner 114. In FIG. 7, the mixer 128 mixes the gain adjusted speech signal and the gain adjusted noise signal to generate the output audio signal 132 that is adjusted to provide output sound 172 having the target SNR (e.g., as indicated by settings 116) in order to improve user perception of speech without significant loss of situational awareness.

Figure 8:
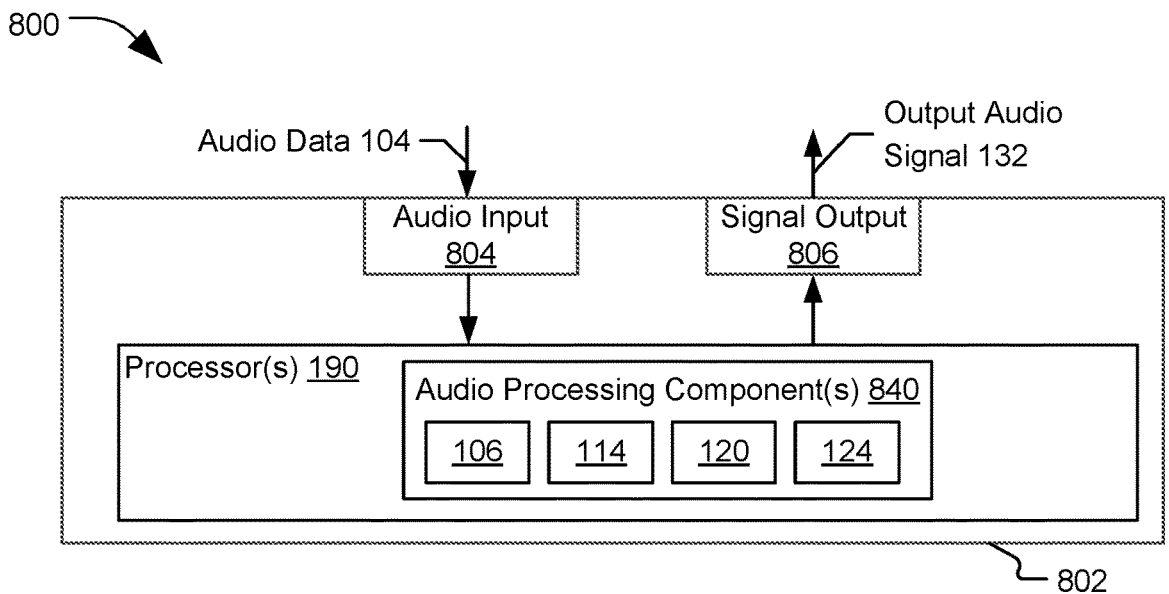
FIG. 8 illustrates an example of an integrated circuit operable to perform audio processing based on a target signal-to-noise ratio, in accordance with some examples of the present disclosure.
Figure 11:
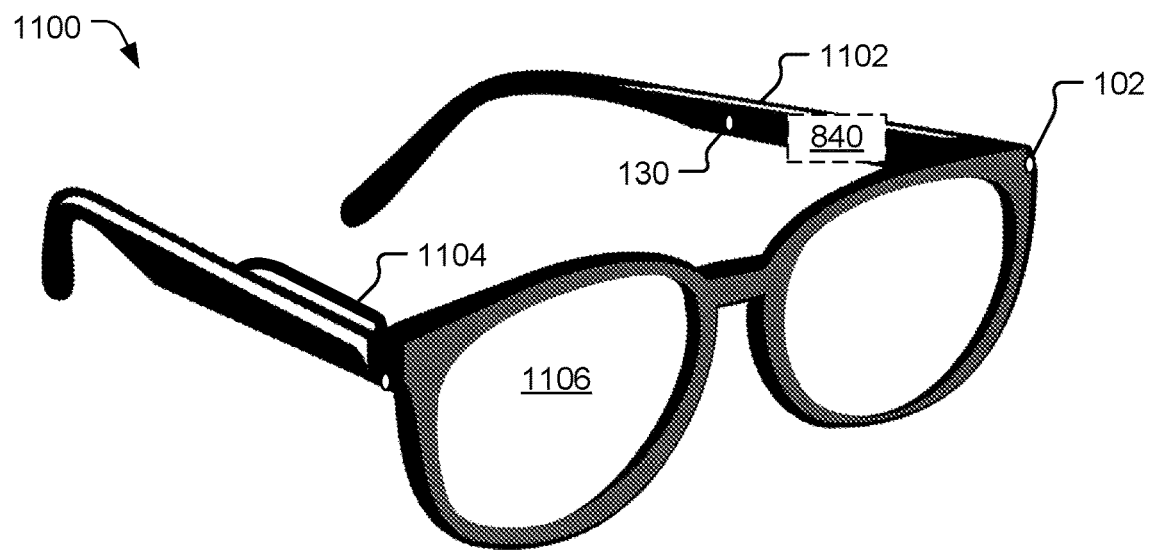
FIG. 11 is a diagram of augmented reality glasses operable to perform audio processing based on a target signal-to-noise ratio, in accordance with some examples of the present disclosure.
Figure 12:
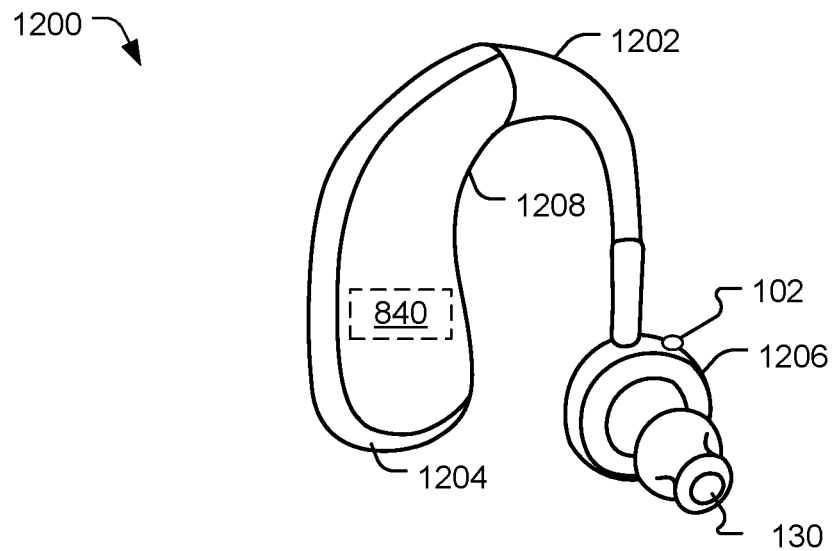
FIG. 12 is a diagram of a wearable device operable to perform audio processing based on a target signal-to-noise ratio, in accordance with some examples of the present disclosure.
Figure 13:
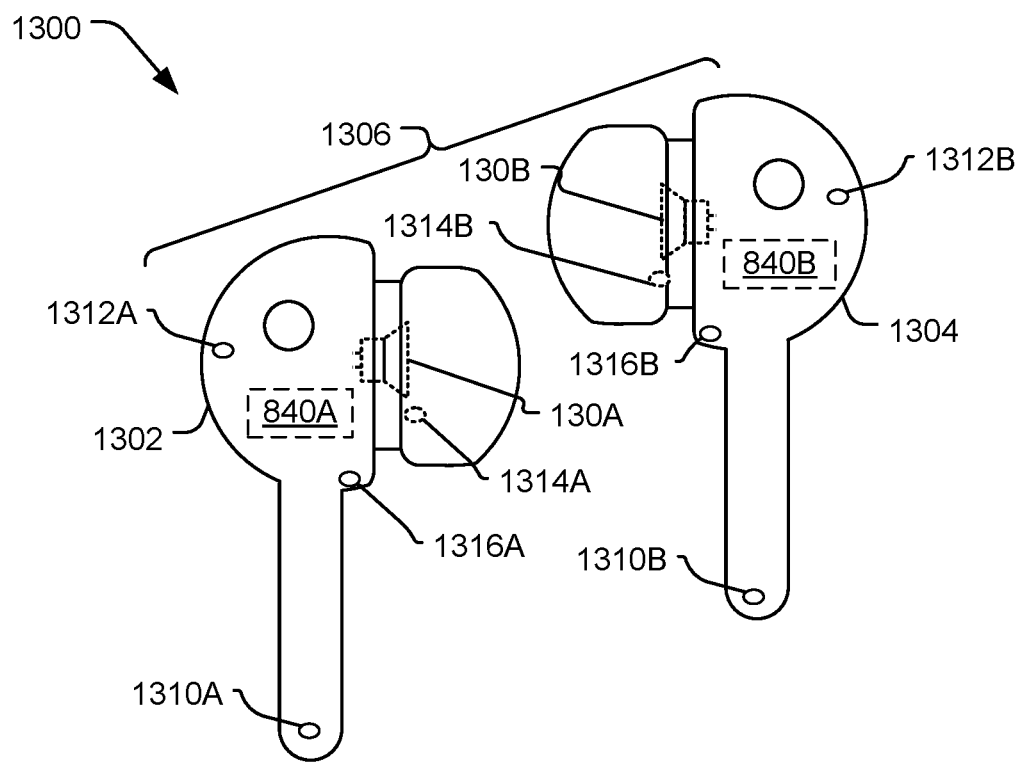
FIG. 13 is a diagram of earbuds operable to perform audio processing based on a target signal-to-noise ratio, in accordance with some examples of the present disclosure.

FIG. 8 depicts an implementation 800 of the device 100 as an integrated circuit 802 operable to perform audio processing based on a target signal-to-noise ratio. The integrated circuit 802 includes the one or more processors 190 and an audio input 804, such as one or more bus interfaces, to enable the audio data 104 to be received for processing by the processor(s) 190. The integrated circuit 802 also includes a signal output 806, such as a bus interface, to enable output of the output audio signal 132. In FIG. 8, the processor(s) 190 of the integrated circuit 802 include one or more audio processing components 840, such as the source separator 106, the gain determiner 114, the first gain module 120, the second gain module 124, etc. Optionally, the audio processing component(s) 840 can include other components as described above with reference to FIGS. 1-7. The integrated circuit 802 enables implementation of audio processing based on a target SNR as a component in a system, such as a wearable device that includes microphones, such as the headset as depicted in FIG. 9, a virtual reality, mixed reality, or augmented reality headset as depicted in FIG. 10, augmented reality headset glasses as depicted in FIG. 11, a wearable device as depicted in FIG. 12, earbuds as depicted in FIG. 13, or another wearable device.

Figure 9:
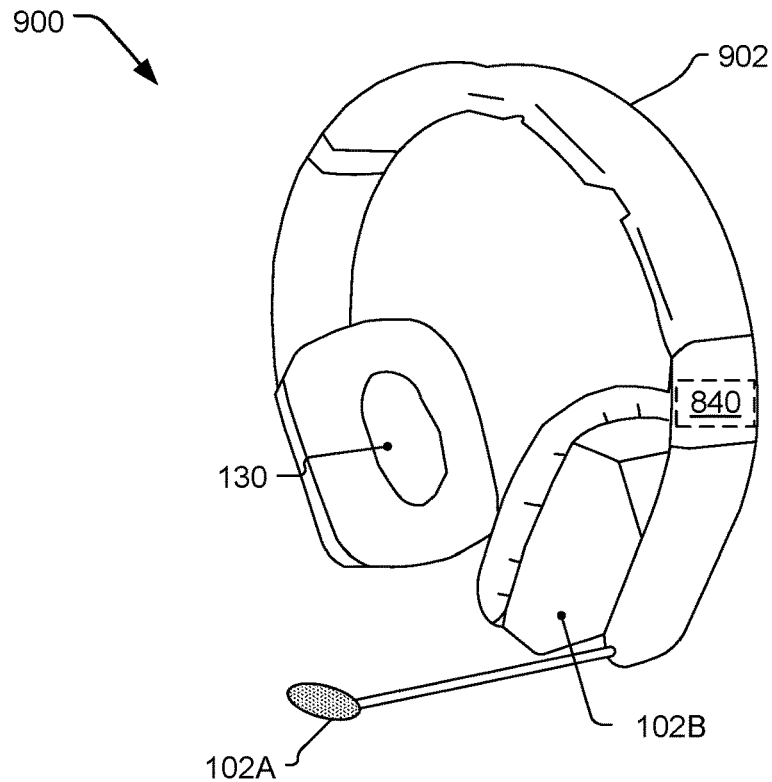
FIG. 9 is a diagram of a headset operable to perform audio processing based on a target signal-to-noise ratio, in accordance with some examples of the present disclosure.

FIG. 9 depicts an implementation 900 in which the device 100 includes a headset device 902 operable to perform audio processing based on a target signal-to-noise ratio. The headset device 902 includes the microphone(s) 102 and the speaker(s) 130. In the example illustrated in FIG. 9, the microphone 102A is positioned primarily to detect speech from a person wearing the headset device 902, and the microphone 102B is positioned to detect ambient sound, such as speech from another person or other sounds. Components of the processor(s) 190, including the audio processing components 840, are integrated in the headset device 902 and depicted using dashed lines to indicate components not generally visible to a user of the headset device 902.

In a particular example of operation, the microphone 102B can detect sound in an environment around the headset device 902 and generate audio data representing the sound. The audio data can be provided to the audio processing components 840, which can process the audio data. For example, the source separator 106 of the audio processing components 840 can process the audio data (e.g., in the time domain) to identify first components of the audio data that correspond to target sound and second components of the audio data that correspond to non-target sound. In this example, the gain determiner 114 of the audio components can determine a first gain to apply to first components and a second gain to apply to second components of the audio data based on a specified target SNR. The first gain module 120 of the audio processing components 840 can apply the first gain to the first audio components to generate gain adjusted target audio data, and the second gain module 124 of the audio processing components 840 can apply the second gain to the second audio components to generate gain adjusted non-target audio data. The audio processing components 840 can mix the gain adjusted target audio data and the gain adjusted non-target audio data to generate the output audio signal 132 such that the output audio signal 132 has the target SNR. In some implementations, the source separator 106 can identify the first and second components of the audio data based on frequency-domain processing of the audio data.

Figure 10:
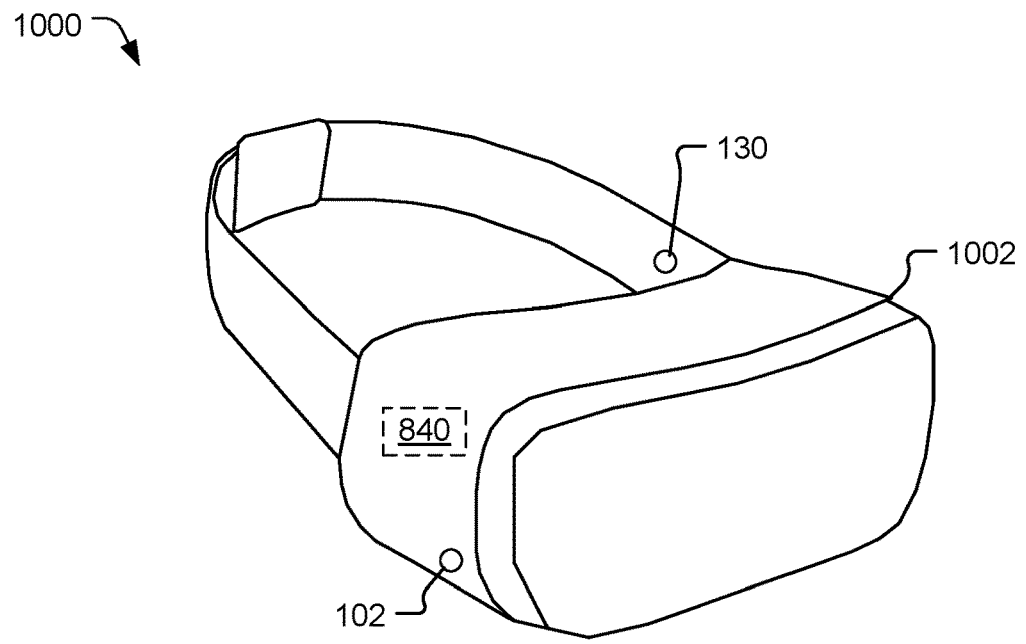
FIG. 10 is a diagram of a headset, such as a virtual reality, mixed reality, or augmented reality headset, operable to perform audio processing based on a target signal-to-noise ratio, in accordance with some examples of the present disclosure.

FIG. 10 depicts an implementation 1000 in which the device 100 includes a portable electronic device that corresponds to a virtual reality, mixed reality, or augmented reality headset device 1002. The headset device 1002 includes the microphone(s) 102 and the speaker(s) 130. Additionally, components of the processor(s) 190, including the audio processing components 840, are integrated in the headset device 1002. In a particular example of operation, the microphone(s) 102 can detect sound in an environment around the headset device 1002 and generate audio data representing the sound. The audio data can be provided to the audio processing components 840, which can process the audio data. For example, the source separator 106 of the audio processing components 840 can process the audio data (e.g., in the time domain) to identify first components of the audio data that correspond to target sound and second components of the audio data that correspond to non-target sound. In this example, the gain determiner 114 of the audio components can determine a first gain to apply to first components and a second gain to apply to second components of the audio data based on a specified target SNR. The first gain module 120 of the audio processing components 840 can apply the first gain to the first audio components to generate gain adjusted target audio data, and the second gain module 124 of the audio processing components 840 can apply the second gain to the second audio components to generate gain adjusted non-target audio data. The audio processing components 840 can mix the gain adjusted target audio data and the gain adjusted non-target audio data to generate the output audio signal 132 such that the output audio signal 132 has the target SNR. In some implementations, the source separator 106 can identify the first and second components of the audio data based on frequency-domain processing of the audio data.

FIG. 11 depicts an implementation 1100 in which the device 100 includes a portable electronic device that corresponds to augmented reality or mixed reality glasses 1102. The glasses 1102 include a holographic projection unit 1104 configured to project visual data onto a surface of a lens 1106 or to reflect the visual data off of a surface of the lens 1106 and onto the wearer's retina. The glasses 1102 also include the microphone(s) 102, the speaker(s) 130, and the processor(s) 190, which include the audio processing components 840.

In a particular example of operation, the microphone(s) 102 can detect sound in an environment around the glasses 1102 and generate audio data representing the sound. The audio data can be provided to the audio processing components 840, which can process the audio data. For example, the source separator 106 of the audio processing components 840 can process the audio data (e.g., in the time domain) to identify first components of the audio data that correspond to target sound and second components of the audio data that correspond to non-target sound. In this example, the gain determiner 114 of the audio components can determine a first gain to apply to first components and a second gain to apply to second components of the audio data based on a specified target SNR. The first gain module 120 of the audio processing components 840 can apply the first gain to the first audio components to generate gain adjusted target audio data, and the second gain module 124 of the audio processing components 840 can apply the second gain to the second audio components to generate gain adjusted non-target audio data. The audio processing components 840 can mix the gain adjusted target audio data and the gain adjusted non-target audio data to generate the output audio signal 132 such that the output audio signal 132 has the target SNR. In some implementations, the source separator 106 can identify the first and second components of the audio data based on frequency-domain processing of the audio data.

In some implementations, the holographic projection unit 1104 is configured to display information related to the sound detected by the microphone(s) 102. For example, the holographic projection unit 1104 can display a notification indicating that speech has been detected. In another example, the holographic projection unit 1104 can display a notification indicating a detected audio event. For example, the notification can be superimposed on the user's field of view at a particular position that coincides with the location of the source of the sound associated with the audio event.

FIG. 12 depicts an implementation 1200 in which the device 100 includes a wearable device operable to perform low-latency noise suppression, in accordance with some examples of the present disclosure. In the example illustrated in FIG. 12, the wearable device is a hearing aid device 1202. The hearing aid device 1202 includes the microphone(s) 102, the speaker(s) 130, and the processor(s) 190, which include the audio processing components 840. In the example illustrated in FIG. 12, the hearing aid device 1202 includes a portion 1204 configured to be worn behind an ear of the user, a portion 1208 configured to extend over the ear, and a portion 1206 to be worn at or near an ear canal of the user. In other examples, the hearing aid device 1202 has a different configuration or form factor. To illustrate, the hearing aid device 1202 can be an in-ear device that does not include the portion 1204 configured to be worn behind an ear and the portion 1208 configured to extend over the ear.

In a particular example of operation of the hearing aid device 1202, the microphone(s) 102 can detect sound in an environment around the hearing aid device 1202 and generate audio data representing the sound. The audio data can be provided to the audio processing components 840, which can process the audio data. For example, the source separator 106 of the audio processing components 840 can process the audio data (e.g., in the time domain) to identify first components of the audio data that correspond to target sound and second components of the audio data that correspond to non-target sound. In this example, the gain determiner 114 of the audio components can determine a first gain to apply to first components and a second gain to apply to second components of the audio data based on a specified target SNR. The first gain module 120 of the audio processing components 840 can apply the first gain to the first audio components to generate gain adjusted target audio data, and the second gain module 124 of the audio processing components 840 can apply the second gain to the second audio components to generate gain adjusted non-target audio data. The audio processing components 840 can mix the gain adjusted target audio data and the gain adjusted non-target audio data to generate output audio signal 132 such that the output audio signal 132 has the target SNR. In some implementations, the source separator 106 can identify the first and second components of the audio data based on frequency-domain processing of the audio data.

FIG. 13 depicts an implementation 1300 in which the device 100 includes a portable electronic device that corresponds to one or more earbuds 1306 (e.g., a first earbud 1302, a second earbud 1304, or both). Although earbuds 1306 are described, it should be understood that the present technology can be applied to other in-ear or over-ear audio devices.

In the example illustrated in FIG. 13, the first earbud 1302 includes a first microphone 1310A, such as a high signal-to-noise microphone positioned to capture the voice of a wearer of the first earbud 1302, one or more other microphones configured to detect ambient sounds and spatially distributed to support beamforming, illustrated as microphone(s) 1312A, an "inner" microphone 1314A proximate to the wearer's ear canal (e.g., to assist with active noise cancelling), and a self-speech microphone 1316A, such as a bone conduction microphone configured to convert sound vibrations of the wearer's ear bone or skull into an audio signal. In a particular implementation, the microphone(s) 1312A correspond to the microphone(s) 102 of any of FIGS. 1-7.

The second earbud 1304 can be configured in a substantially similar manner as the first earbud 1302. For example, the second earbud can include a microphone 1310B positioned to capture the voice of a wearer of the second earbud 1304, one or more other microphones 1312B configured to detect ambient sounds and spatially distributed to support beamforming, an "inner" microphone 1314B, and a self-speech microphone 1316B.

In some implementations, the earbuds 1302, 1304 are configured to automatically switch between various operating modes, such as a passthrough mode in which ambient sound is processed, by the audio processing components 840, for output via a speaker(s) 130, and a playback mode in which non-ambient sound (e.g., streaming audio corresponding to a phone conversation, media playback, video game, etc.) is played back through the speaker(s) 130. In other implementations, the earbuds 1302, 1304 may support fewer modes or may support one or more other modes in place of, or in addition to, the described modes.

In an illustrative example of operation in the passthrough mode, one or more of the microphone(s) 102 (e.g., the microphone(s) 1312A, 1312B) can detect sound in an environment around the earbuds 1302, 1304 and generate audio data representing the sound. The audio data can be provided to one or both of the audio processing components 840A, 840B, which can process the audio data. For example, the source separator 106 of the audio processing components 840 can process the audio data (e.g., in the time domain) to identify first components of the audio data that correspond to target sound and second components of the audio data that correspond to non-target sound. In this example, the gain determiner 114 of the audio components can determine a first gain to apply to first components and a second gain to apply to second components of the audio data based on a specified target SNR. The first gain module 120 of the audio processing components 840 can apply the first gain to the first audio components to generate gain adjusted target audio data, and the second gain module 124 of the audio processing components 840 can apply the second gain to the second audio components to generate gain adjusted non-target audio data. The audio processing components 840 can mix the gain adjusted target audio data and the gain adjusted non-target audio data to generate output audio signal 132 such that the output audio signal 132 has the target SNR. In some implementations, the source separator 106 can identify the first and second components of the audio data based on frequency-domain processing of the audio data.

Figure 14:
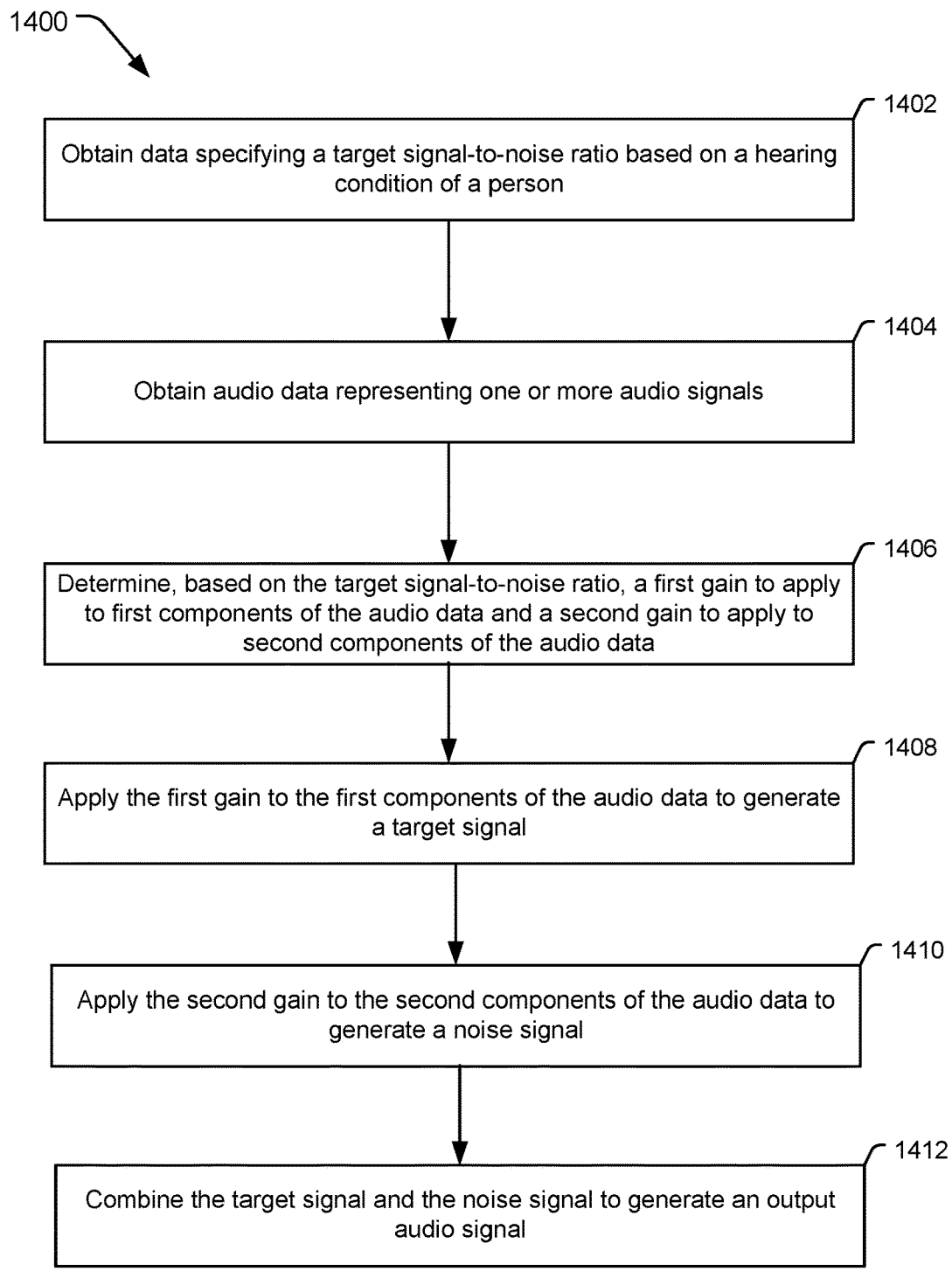
FIG. 14 is a diagram of a particular implementation of a method of performing audio processing based on a target signal-to-noise ratio that may be performed by the device of FIG. 1, in accordance with some examples of the present disclosure.

FIG. 14 is a diagram of a particular implementation of a method 1400 of audio processing based on a target signal-to-noise ratio that may be performed by the device of FIG. 1, in accordance with some examples of the present disclosure. In a particular aspect, one or more operations of the method 1400 are performed by at least one of the device 100, the processor(s) 190, or the audio processing components 840, variously described with reference to FIGS. 1-13, or a combinations thereof.

The method 1400 includes, at block 1402, obtaining data specifying a target signal-to-noise (SNR) ratio based on a hearing condition of a person. For example, referring to FIG. 1, the target SNR can be indicated by the settings 116. The settings 116 can be specified by a user (e.g., in user-specified settings) via a user interface of a wearable device (e.g., the device 100) or via a user interface of another device (e.g., the second device 150) that communicates the settings 116 to the wearable device.

The method 1400 includes, at block 1404, obtaining audio data representing one or more audio signals. For example, referring to FIG. 1, the audio data 104 represents the audio signal(s) received from the microphone(s) 102. In this example, the microphone(s) 102 generate the audio signal(s) based on the sound 170 present in an environment around the device 100.

The method 1400 includes, at block 1406, determining, based on the target signal-to-noise ratio, a first gain to apply to first components of the audio data and a second gain to apply to second components of the audio data. For example, the gain determiner 114 of FIG. 1 can determine the first and second gains based on the settings 116 and optionally other information, such as the signal 112 from the source separator 106, the feedback signal 278 of FIG. 2, or both. In some implementations, the first components include first audio data representing speech and the second components include second audio data representing non-speech sounds.

The method can also include performing time-domain source separation to generate a first signal representing the first components and a second signal representing the second components. In some implementations, as described with refence to FIG. 7, the method 1400 can include providing input data based on at least one of the one or more audio signals to one or more neural networks (e.g., the speech extraction neural network 702 and the noise extraction neural network 704 of FIG. 7) that are trained to generate, based on the input data, the first signal representing the first components and the second signal representing the second components. In some such implementations, the neural network(s) are low-latency networks configured to operate on time-domain audio data (e.g., the audio data 104).

In other implementations, performing the time-domain source separation can using frequency-domain processing to determine time-domain filter coefficients to apply to the audio data 104 to determine a first signal representing the first components and a second signal representing the second components. For example, the first signal can be generated by applying first time-domain filter coefficients to at least one of the one or more audio signals and the second signal can be generated by applying second time-domain filter coefficients to at least one of the one or more audio signals. In this example, one or more frequency-domain operations, based on at least one of the one or more audio signals, can be performed to determine the first time-domain filter coefficients and the second time-domain filter coefficients.

To illustrate, performing the one or more frequency-domain operations includes performing one or more transform operations, based on one or more samples of the audio data, to generate frequency domain audio data. The frequency domain audio data can be processed in various ways in different implementations. In some implementations, beamforming operations can be performed (e.g., by the beamformer(s) 402 of FIG. 4), based on the frequency domain audio data, to distinguish first frequency bins associated with target audio in the one or more samples of the audio data and second frequency bins associated with non-target audio in the one or more samples of the audio data. In other implementations, blind source separation operations can be performed (e.g., by the blind source separation module 502 of FIG. 5), based on the frequency domain audio data, to distinguish first frequency bins associated with target audio in the one or more samples of the audio data and second frequency bins associated with non-target audio in the one or more samples of the audio data. In other implementations, the frequency domain audio data can be input to one or more machine-learning models (e.g., the machine-learning model(s) 602 of FIG. 6), which are trained to distinguish first frequency bins associated with target audio in the one or more samples of the audio data and second frequency bins associated with non-target audio in the one or more samples of the audio data. In still other implementations, other frequency-domain source separators (e.g., the frequency-domain source separators 204 of FIG. 2) can perform frequency-domain source separation operations based on the frequency domain audio data to distinguish first frequency bins associated with target audio in the one or more samples of the audio data and second frequency bins associated with non-target audio in the one or more samples of the audio data.

In implementations in which frequency domain audio data is processed to distinguish or generate first frequency bins associated with target audio and second frequency bins associated with non-target audio, the method can include determining the first time-domain filter coefficients based on the first frequency bins and determining the second time-domain filter coefficients based on the second frequency bins. For example, the filter designer 210 of FIG. 2. can use one or more inverse domain transformation operations and parameterization operations to generate the first time-domain filter coefficients based on the first frequency bins associated with target audio, and the filter designer 212 of FIG. 2. can use the same or different inverse domain transformation operations and parameterization operations to generate the second time-domain filter coefficients based on the second frequency bins associated with non-target audio.

In FIG. 14, the method 1400 includes, at block 1408, applying the first gain to the first components of the audio data to generate a target signal, and, at block 1410, applying the second gain to the second components of the audio data to generate a noise signal. For example, the first gain module 120 applies the first gain to the first signal 108, which includes first components of the audio data 104 (e.g., components corresponding to target audio). In this example, the second gain module 124 applies the second gain to the second signal 110, which includes second components of the audio data 104 (e.g., components corresponding to non-target audio).

The method 1400 includes, at block 1412, combining the target signal and the noise signal to generate an output audio signal. For example, the mixer 128 of FIG. 1 combines the target signal (e.g., the first gain adjusted signal 122) and the non-target signal (e.g., the second gain adjusted signal 126) to generate the output audio signal 132.

Optionally, in some implementations, the method 1400 can also include other audio processing operations. For example, in some implementations, the method 1400 can include performing feedback adaptive noise cancellation based on a feedback signal, performing feedforward adaptive noise cancellation based on the audio data, or both, to generate the output audio signal.

Thus, the method 1400 enables generation of an output audio signal based on a target SNR that can be user specified. In particular implementations, a delay between obtaining particular audio data and generating a corresponding output audio signal representing the particular audio data is less than one millisecond. Such low-latency processing is desirable for audio processing in wearables since high-latency can lead to a poor user experience. In some implementations, the method 1400 uses certain relatively high-latency processes, such as frequency-domain source separation, to improve audio source separation; however, such high-latency processes are applied indirectly. For example, frequency-domain audio processing is used to generate time-domain filter coefficients in a manner that does not delay processing of audio data for output to a user. To avoid delaying processing of audio data for output to the user, the frequency-domain audio processing is performed in parallel with time-domain processing to generate output audio. In this arrangement, the time-domain filter coefficients generated via frequency-domain processing are delayed relative to audio data processed in the time-domain.

The method 1400 of FIG. 14 may be implemented by a field-programmable gate array (FPGA) device, an application-specific integrated circuit (ASIC), a processing unit such as a central processing unit (CPU), a DSP, a controller, another hardware device, firmware device, or any combination thereof. As an example, the method 1400 of FIG. 14 may be performed by one or more processors that execute instructions, such as described with reference to FIG. 15.

Figure 15:
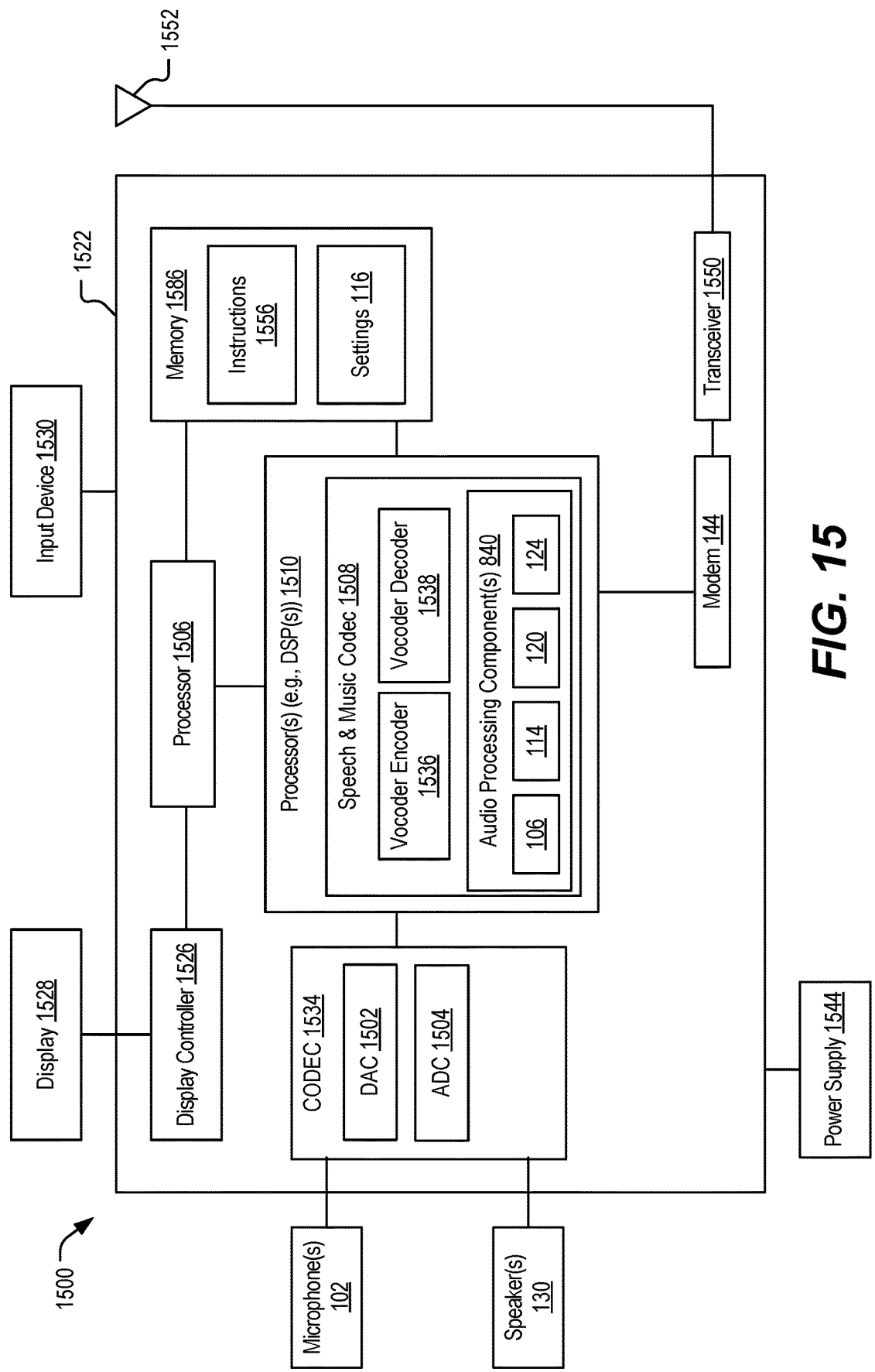
FIG. 15 is a block diagram of a particular illustrative example of a device that is operable to perform audio processing based on a target signal-to-noise ratio, in accordance with some examples of the present disclosure.

Referring to FIG. 15, a block diagram of a particular illustrative implementation of a device is depicted and generally designated 1500. In various implementations, the device 1500 may have more or fewer components than illustrated in FIG. 15. In an illustrative implementation, the device 1500 may correspond to the device 100. In an illustrative implementation, the device 1500 may perform one or more operations described with reference to FIGS. 1-14.

In a particular implementation, the device 1500 includes a processor 1506 (e.g., a central processing unit (CPU)). The device 1500 may include one or more additional processors 1510 (e.g., one or more DSPs). In a particular aspect, the processor(s) 190 of FIG. 1 correspond to the processor 1506, the processor(s) 1510, or a combination thereof. The processor(s) 1510 may include a speech and music coder-decoder (CODEC) 1508 that includes a voice coder ("vocoder") encoder 1536 and a vocoder decoder 1538. The processor(s) 1510 and/or the speech and music CODEC 1508 include the audio processing component(s) 840, such as the source separator 106, the gain determiner 114, the first gain module 120, the second gain module 124. Optionally, the audio processing component(s) 840 can include other components as described above with reference to FIGS. 1-7.

In FIG. 15, the device 1500 includes a memory 1586 and a CODEC 1534. The memory 1586 includes (e.g., stores) instructions 1556 that are executable by the one or more additional processors 1510 (or the processor 1506) to implement the functionality described with reference to the device 100 of FIG. 1. The memory 1586 may also store the settings 116, which indicate a target SNR of an output audio signal that is to be generated based on received audio data. In FIG. 15, the device 1500 also includes the modem 144 coupled, via a transceiver 1550, to an antenna 1552. The modem 144, transceiver 1550, and antenna 1552 enable the device 1500 to exchange data with one or more other devices via wireless communications. For example, in some implementations, the device 1500 can generate audio output at the speaker(s) 130 based on data (such as the settings 116 or another indication of the target SNR) received via wireless communication with another device (e.g., the second device 150 of FIG. 1).

The device 1500 may include a display 1528 coupled to a display controller 1526. The speaker(s) 130 and the microphone(s) 102 may be coupled to the CODEC 1534. In FIG. 15, the CODEC 1534 includes a digital-to-analog converter (DAC) 1502 and an analog-to-digital converter (ADC) 1504. In a particular implementation, the CODEC 1534 may receive analog signals from the microphone(s) 102, convert the analog signals to digital signals (e.g., the audio data 104 of FIGS. 1-7) using the analog-to-digital converter 1504, and provide the digital signals to the speech and music codec 1508. The speech and music codec 1508 may process the digital signals. The digital signals may further be processed by audio processing components 840. For example, the source separator 106 of the audio processing components 840 can process the audio data (e.g., in the time domain) to identify first components of the audio data that correspond to target sound and second components of the audio data that correspond to non-target sound. In this example, the gain determiner 114 of the audio components can determine a first gain to apply to first components and a second gain to apply to second components of the audio data based on a specified target SNR. The first gain module 120 of the audio processing components 840 can apply the first gain to the first audio components to generate gain adjusted target audio data, and the second gain module 124 of the audio processing components 840 can apply the second gain to the second audio components to generate gain adjusted non-target audio data. The audio processing components 840 can mix the gain adjusted target audio data and the gain adjusted non-target audio data to generate the output audio signal 132 such that the output audio signal 132 has the target SNR. In some implementations, the source separator 106 can identify the first and second components of the audio data based on frequency-domain processing of the audio data.

In a particular implementation, the speech and music codec 1508 may provide digital signals representing the output audio signal generated by the audio processing components 840 and/or other audio content to the CODEC 1534. The CODEC 1534 may convert the digital signals to analog signals using the digital-to-analog converter 1502 and may provide the analog signals to the speaker(s) 130.

In a particular implementation, the device 1500 may be included in a system-in-package or system-on-chip device 1522. In a particular implementation, the memory 1586, the processor 1506, the processors 1510, the display controller 1526, the CODEC 1534, and the modem 144 are included in the system-in-package or system-on-chip device 1522. In a particular implementation, an input device 1530 and a power supply 1544 are coupled to the system-in-package or the system-on-chip device 1522. Moreover, in a particular implementation, as illustrated in FIG. 15, the display 1528, the input device 1530, the speaker(s) 130, the microphone(s) 102, the antenna 1552, and the power supply 1544 are external to the system-in-package or the system-on-chip device 1522. In a particular implementation, each of the display 1528, the input device 1530, the speaker(s) 130, the microphone(s) 102, the antenna 1552, and the power supply 1544 may be coupled to a component of the system-in-package or the system-on-chip device 1522, such as an interface or a controller.

The device 1500 may include a wearable device, such as a wearable mobile communication device, a wearable personal digital assistant, a wearable display device, a wearable gaming system, a wearable music player, a wearable radio, a wearable camera, a wearable navigation device, a headset, an augmented reality headset, a mixed reality headset, a virtual reality headset, a voice-activated device, a portable electronic device, a wearable computing device, a wearable communication device, a virtual reality (VR) device, one or more earbuds, a hearing aid device, or any combination thereof.

In conjunction with the described implementations, an apparatus includes means for obtaining data specifying a target signal-to-noise ratio based on a hearing condition of a person. For example, the means for obtaining the data specifying the target signal-to-noise ratio can correspond to the device 100, the second device 150, the processor(s) 190, the gain determiner 114, the modem 144, the memory 162, the input device 1530, the transceiver 1550, the processor 1506, the processor(s) 1510, one or more other circuits or components configured to obtain data specifying a target signal-to-noise ratio based on a hearing condition of a person, or any combination thereof.

The apparatus also includes means for obtaining audio data representing one or more audio signals. For example, the means for obtaining audio data representing one or more audio signals can correspond to the device 100, the microphone(s) 102, the processor(s) 190, the source separator 106, the audio input 804, the CODEC 1534, the processor 1506, the processor(s) 1510, one or more other circuits or components configured to obtain audio data representing one or more audio signals, or any combination thereof.

The apparatus also includes means for determining, based on the target signal-to-noise ratio, a first gain to apply to first components of the audio data and a second gain to apply to second components of the audio data. For example, the means for determining the first gain and the second gain can correspond to the device 100, the gain determiner 114, the processor(s) 190, the processor 1506, the processor(s) 1510, one or more other circuits or components configured to determine, based on a target signal-to-noise ratio, a first gain to apply to first components of audio data and a second gain to apply to second components of the audio data, or any combination thereof.

The apparatus also includes means for applying the first gain to the first components of the audio data to generate a target signal. For example, the means for applying the first gain to the first components of the audio data to generate the target signal can correspond to the device 100, the first gain module 120, the processor(s) 190, the speech gain module 310, the speech gain module 720, the processor 1506, the processor(s) 1510, one or more other circuits or components configured to apply a first gain to first components of audio data to generate a target signal, or any combination thereof.

The apparatus also includes means for applying the second gain to the second components of the audio data to generate a noise signal. For example, the means for applying the second gain to the second components of the audio data to generate the noise signal can correspond to the device 100, the second gain module 120, the processor(s) 190, the noise gain module 312, the noise gain module 724, the processor 1506, the processor(s) 1510, one or more other circuits or components configured to apply a second gain to second components of audio data to generate a noise signal, or any combination thereof.

The apparatus also includes means for combining the target signal and the noise signal to generate an output audio signal. For example, the means for combining the target signal and the noise signal to generate the output audio signal can correspond to the device 100, the mixer 128, the processor(s) 190, the processor 1506, the processor(s) 1510, one or more other circuits or components configured to combine a target signal and a noise signal to generate an output audio signal, or any combination thereof.

In some implementations, a non-transitory computer-readable medium (e.g., a computer-readable storage device, such as the memory 1586) includes instructions (e.g., the instructions 1556) that, when executed by one or more processors (e.g., the one or more processors 1510 or the processor 1506), cause the one or more processors to obtain data specifying a target signal-to-noise ratio based on a hearing condition of a person; obtain audio data representing one or more audio signals; determine, based on the target signal-to-noise ratio, a first gain to apply to first components of the audio data and a second gain to apply to second components of the audio data; apply the first gain to the first components of the audio data to generate a target signal; apply the second gain to the second components of the audio data to generate a noise signal; and combine the target signal and the noise signal to generate an output audio signal.

Particular aspects of the disclosure are described below in sets of interrelated Examples:

According to Example 1, a device includes one or more processors configured to obtain data specifying a target signal-to-noise ratio based on a hearing condition of a person; obtain audio data representing one or more audio signals; determine, based on the target signal-to-noise ratio, a first gain to apply to first components of the audio data and a second gain to apply to second components of the audio data; apply the first gain to the first components of the audio data to generate a target signal; apply the second gain to the second components of the audio data to generate a noise signal; and combine the target signal and the noise signal to generate an output audio signal.

Example 2 includes the device of Example 1, wherein the data specifying the target signal-to-noise ratio is obtained from user-specified settings.

Example 3 includes the device of Example 1 or Example 2, wherein the first components include first audio data representing speech and the second components include second audio data representing non-speech sounds.

Example 4 includes the device of any of Examples 1 to 3, wherein a delay between obtaining particular audio data and generating a corresponding output audio signal representing the particular audio data is less than one millisecond.

Example 5 includes the device of any of Examples 1 to 4 and further includes one or more microphones coupled to the one or more processors, and wherein the audio data represents sounds captured by the one or more microphones.

Example 6 includes the device of any of Examples 1 to 5, wherein the one or more processors are integrated into a wearable device.

Example 7 includes the device of any of Examples 1 to 6 and further includes a modem coupled the one or more processors and configured to receive the data specifying a target signal-to-noise ratio from a second device.

Example 8 includes the device of any of Examples 1 to 7 and further includes one or more speakers and one or more microphones coupled to the one or more processors, wherein the one or more microphones include at least one microphone configured to generate the audio data and at least one microphone configured to generate a feedback signal based on sound produced by the one or more speakers responsive to the output audio signal.

Example 9 includes the device of any of Examples 1 to 8, wherein the one or more processors are configured to determine the first gain and the second gain based at least in part on a feedback signal.

Example 10 includes the device of any of Examples 1 to 9, wherein the one or more processors are configured to perform feedback adaptive noise cancellation based on a feedback signal to generate the output audio signal.

Example 11 includes the device of any of Examples 1 to 10, wherein the one or more processors are configured to perform feedforward adaptive noise cancellation based on the audio data to generate the output audio signal.

Example 12 includes the device of any of Examples 1 to 11, wherein the one or more processors are configured to perform time-domain source separation operations to generate a first signal representing the first components and a second signal representing the second components, wherein the first gain is applied to the first signal and the second gain is applied to the second signal.

Example 13 includes the device of Example 12, wherein performing the time-domain source separation operations includes applying first time-domain filter coefficients to at least one of the one or more audio signals to generate the first signal representing the first components and applying second time-domain filter coefficients to at least one of the one or more audio signals to generate the second signal representing the second components.

Example 14 includes the device of Example 13, wherein the one or more processors are configured to perform one or more frequency-domain operations, based on at least one of the one or more audio signals, to determine the first time-domain filter coefficients and the second time-domain filter coefficients.

Example 15 includes the device of Example 13 or Example 14, wherein the one or more processors are configured to perform one or more transform operations, based on one or more samples of the audio data, to generate frequency domain audio data; perform beamforming operations, based on the frequency domain audio data, to distinguish first frequency bins associated with target audio in the one or more samples of the audio data and second frequency bins associated with non-target audio in the one or more samples of the audio data; determine the first time-domain filter coefficients based on the first frequency bins; and determine the second time-domain filter coefficients based on the second frequency bins.

Example 16 includes the device of Example 13 or Example 14, wherein the one or more processors are configured to perform one or more transform operations, based on one or more samples of the audio data, to generate frequency domain audio data; perform blind source separation operations, based on the frequency domain audio data, to distinguish first frequency bins associated with target audio in the one or more samples of the audio data and second frequency bins associated with non-target audio in the one or more samples of the audio data; determine the first time-domain filter coefficients based on the first frequency bins; and determine the second time-domain filter coefficients based on the second frequency bins.

Example 17 includes the device of Example 12, wherein performing the time-domain source separation operations includes providing input data based on at least one of the one or more audio signals to one or more neural networks that are trained to generate, based on the input data, the first signal representing the first components and the second signal representing the second components.

According to Example 18, a method includes obtaining, at one or more processors, data specifying a target signal-to-noise ratio based on a hearing condition of a person; obtaining, at the one or more processors, audio data representing one or more audio signals; determining, at the one or more processors based on the target signal-to-noise ratio, a first gain to apply to first components of the audio data and a second gain to apply to second components of the audio data; applying the first gain to the first components of the audio data to generate a target signal; applying the second gain to the second components of the audio data to generate a noise signal; and combining the target signal and the noise signal to generate an output audio signal.

Example 19 includes the method of Example 18, wherein the data specifying the target signal-to-noise ratio is obtained from user-specified settings.

Example 20 includes the method of Example 18 or Example 19, wherein the first components include first audio data representing speech and the second components include second audio data representing non-speech sounds.

Example 21 includes the method of any of Examples 18 to 20, wherein a delay between obtaining particular audio data and generating a corresponding output audio signal representing the particular audio data is less than one millisecond.

Example 22 includes the method of any of Examples 18 to 21, wherein the audio data represents sounds captured by one or more microphones coupled to the one or more processors.

Example 23 includes the method of any of Examples 18 to 22, wherein the one or more processors are integrated into a wearable device.

Example 24 includes the method of any of Examples 18 to 23 and further includes performing feedforward adaptive noise cancellation based on the audio data.

Example 25 includes the method of any of Examples 18 to 24 and further includes performing feedback adaptive noise cancellation based on a feedback signal to generate the output audio signal.

Example 26 includes the method of any of Examples 18 to 25 and further includes determining the first gain and the second gain based at least in part on a feedback signal.

Example 27 includes the method of any of Examples 18 to 26 and further includes performing time-domain source separation to generate a first signal representing the first components and a second signal representing the second components, wherein the first gain is applied to the first signal and the second gain is applied to the second signal.

Example 28 includes the method of Example 27, wherein performing time-domain source separation comprises: applying first time-domain filter coefficients to at least one of the one or more audio signals to generate the first signal representing the first components; and applying second time-domain filter coefficients to at least one of the one or more audio signals to generate the second signal representing the second components.

Example 29 includes the method of Example 28 and further includes performing one or more frequency-domain operations, based on at least one of the one or more audio signals, to determine the first time-domain filter coefficients and the second time-domain filter coefficients.

Example 30 includes the method of Example 28 or Example 29 and further includes performing one or more transform operations, based on one or more samples of the audio data, to generate frequency domain audio data; performing beamforming operations, based on the frequency domain audio data, to distinguish first frequency bins associated with target audio in the one or more samples of the audio data and second frequency bins associated with non-target audio in the one or more samples of the audio data; determining the first time-domain filter coefficients based on the first frequency bins; and determining the second time-domain filter coefficients based on the second frequency bins.

Example 31 includes the method of Example 28 or Example 29 and further includes performing one or more transform operations, based on one or more samples of the audio data, to generate frequency domain audio data; performing blind source separation operations, based on the frequency domain audio data, to distinguish first frequency bins associated with target audio in the one or more samples of the audio data and second frequency bins associated with non-target audio in the one or more samples of the audio data; determining the first time-domain filter coefficients based on the first frequency bins; and determining the second time-domain filter coefficients based on the second frequency bins.

Example 32 includes the method of Example 27, wherein performing the time-domain source separation includes providing input data based on at least one of the one or more audio signals to one or more neural networks that are trained to generate, based on the input data, the first signal representing the first components and the second signal representing the second components.

According to Example 33, a device includes: a memory configured to store instructions; and a processor configured to execute the instructions to perform the method of any of Examples 18 to 32.

According to Example 34, a non-transitory computer-readable medium stores instructions that, when executed by a processor, cause the processor to perform the method of any of Examples 18 to 32.

According to Example 35, an apparatus includes means for carrying out the method of any of Examples 18 to 32.

According to Example 36, a non-transitory computer-readable medium stores instructions that, when executed by one or more processors, cause the one or more processors to obtain data specifying a target signal-to-noise ratio based on a hearing condition of a person; obtain audio data representing one or more audio signals; determine, based on the target signal-to-noise ratio, a first gain to apply to first components of the audio data and a second gain to apply to second components of the audio data; apply the first gain to the first components of the audio data to generate a target signal; apply the second gain to the second components of the audio data to generate a noise signal; and combine the target signal and the noise signal to generate an output audio signal.

Example 37 includes the non-transitory computer-readable medium of Example 36, wherein the data specifying the target signal-to-noise ratio is obtained from user-specified settings.

Example 38 includes the non-transitory computer-readable medium of Example 36 or Example 37, wherein the first components include first audio data representing speech and the second components include second audio data representing non-speech sounds.

Example 39 includes the non-transitory computer-readable medium of any of Examples 36 to 38, wherein a delay between obtaining particular audio data and generating a corresponding output audio signal representing the particular audio data is less than one millisecond.

Example 40 includes the non-transitory computer-readable medium of any of Examples 36 to 39, wherein the audio data represents sounds captured by one or more microphones coupled to the one or more processors.

Example 41 includes the non-transitory computer-readable medium of any of Examples 36 to 40, wherein the instructions cause the one or more processors to perform feedforward adaptive noise cancellation based on the audio data to generate the output audio signal.

Example 42 includes the non-transitory computer-readable medium of any of Examples 36 to 41, wherein the instructions cause the one or more processors to perform feedback adaptive noise cancellation based on a feedback signal to generate the output audio signal.

Example 43 includes the non-transitory computer-readable medium of any of Examples 36 to 42, wherein the instructions cause the one or more processors to determine the first gain and the second gain based at least in part on a feedback signal.

Example 44 includes the non-transitory computer-readable medium of any of Examples 36 to 43, wherein the instructions cause the one or more processors to perform time-domain source separation operations to generate a first signal representing the first components and a second signal representing the second components, wherein the first gain is applied to the first signal and the second gain is applied to the second signal.

Example 45 includes the non-transitory computer-readable medium of Example 44, wherein performing the time-domain source separation operations includes applying first time-domain filter coefficients to at least one of the one or more audio signals to generate the first signal representing the first components and applying second time-domain filter coefficients to at least one of the one or more audio signals to generate the second signal representing the second components.

Example 46 includes the non-transitory computer-readable medium of Example 45, wherein the instructions cause the one or more processors to perform one or more frequency-domain operations, based on at least one of the one or more audio signals, to determine the first time-domain filter coefficients and the second time-domain filter coefficients.

Example 47 includes the non-transitory computer-readable medium of Example 45 or Example 46, wherein the instructions cause the one or more processors to perform one or more transform operations, based on one or more samples of the audio data, to generate frequency domain audio data; perform beamforming operations, based on the frequency domain audio data, to distinguish first frequency bins associated with target audio in the one or more samples of the audio data and second frequency bins associated with non-target audio in the one or more samples of the audio data; determine the first time-domain filter coefficients based on the first frequency bins; and determine the second time-domain filter coefficients based on the second frequency bins.

Example 48 includes the non-transitory computer-readable medium of Example 45 or Example 46, wherein the instructions cause the one or more processors to perform one or more transform operations, based on one or more samples of the audio data, to generate frequency domain audio data; perform blind source separation operations, based on the frequency domain audio data, to distinguish first frequency bins associated with target audio in the one or more samples of the audio data and second frequency bins associated with non-target audio in the one or more samples of the audio data; determine the first time-domain filter coefficients based on the first frequency bins; and determine the second time-domain filter coefficients based on the second frequency bins.

Example 49 includes the non-transitory computer-readable medium of Example 44, wherein performing the time-domain source separation operations includes providing input data based on at least one of the one or more audio signals to one or more neural networks that are trained to generate, based on the input data, the first signal representing the first components and the second signal representing the second components.

According to Example 50, an apparatus includes means for obtaining data specifying a target signal-to-noise ratio based on a hearing condition of a person; means for obtaining audio data representing one or more audio signals; means for determining, based on the target signal-to-noise ratio, a first gain to apply to first components of the audio data and a second gain to apply to second components of the audio data; means for applying the first gain to the first components of the audio data to generate a target signal; means for applying the second gain to the second components of the audio data to generate a noise signal; and means for combining the target signal and the noise signal to generate an output audio signal.

Example 51 includes the apparatus of Example 50, wherein the data specifying the target signal-to-noise ratio is obtained from user-specified settings.

Example 52 includes the apparatus of Example 50 or Example 51, wherein the first components include first audio data representing speech and the second components include second audio data representing non-speech sounds.

Example 53 includes the apparatus of any of Examples 50 to 52, wherein a delay between obtaining particular audio data and generating a corresponding output audio signal representing the particular audio data is less than one millisecond.

Example 54 includes the apparatus of any of Examples 50 to 53 and further includes means for generating the audio data based on ambient sound.

Example 55 includes the apparatus of any of Examples 50 to 54, wherein the means for obtaining data specifying the target signal-to-noise ratio, the means for obtaining the audio data, the means for determining the first gain and the second gain, the means for applying the first gain to the first components of the audio data, the means for applying the second gain to the second components of the audio data, and the means for combining are integrated into a wearable device.

Example 56 includes the apparatus of any of Examples 50 to 55 and further includes means for generating sound based on the output audio signal; and means for generating a feedback signal based on the sound.

Example 57 includes the apparatus of any of Examples 50 to 56 and further includes means for performing feedback adaptive noise cancellation based on a feedback signal to generate the output audio signal.

Example 58 includes the apparatus of any of Examples 50 to 57, wherein the first gain and the second gain are based at least in part on a feedback signal.

Example 59 includes the apparatus of any of Examples 50 to 58 and further includes means for performing feedforward adaptive noise cancellation based on the audio data.

Example 60 includes the apparatus of any of Examples 50 to 59 and further includes means for performing time-domain source separation to generate a first signal representing the first components and a second signal representing the second components, wherein the first gain is applied to the first signal and the second gain is applied to the second signal.

Example 61 includes the apparatus of Example 60, wherein performing the time-domain source separation includes applying first time-domain filter coefficients to at least one of the one or more audio signals to generate the first signal representing the first components and applying second time-domain filter coefficients to at least one of the one or more audio signals to generate the second signal representing the second components.

Example 62 includes the apparatus of Example 61 and further includes means for performing one or more frequency-domain operations, based on at least one of the one or more audio signals, to determine the first time-domain filter coefficients and the second time-domain filter coefficients.

Example 63 includes the apparatus of Example 61 or Example 62 and further includes means for performing one or more transform operations, based on one or more samples of the audio data, to generate frequency domain audio data; means for performing beamforming operations, based on the frequency domain audio data, to distinguish first frequency bins associated with target audio in the one or more samples of the audio data and second frequency bins associated with non-target audio in the one or more samples of the audio data; means for determining the first time-domain filter coefficients based on the first frequency bins; and means for determining the second time-domain filter coefficients based on the second frequency bins.

Example 64 includes the apparatus of Example 61 or Example 62 and further includes means for performing one or more transform operations, based on one or more samples of the audio data, to generate frequency domain audio data; means for performing blind source separation operations, based on the frequency domain audio data, to distinguish first frequency bins associated with target audio in the one or more samples of the audio data and second frequency bins associated with non-target audio in the one or more samples of the audio data; means for determining the first time-domain filter coefficients based on the first frequency bins; and means for determining the second time-domain filter coefficients based on the second frequency bins.

Example 65 includes the apparatus of Example 60, wherein performing the time-domain source separation includes providing input data based on at least one of the one or more audio signals to one or more neural networks that are trained to generate, based on the input data, the first signal representing the first components and the second signal representing the second components.

Those of skill would further appreciate that the various illustrative logical blocks, configurations, modules, circuits, and algorithm steps described in connection with the implementations disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, such implementation decisions are not to be interpreted as causing a departure from the scope of the present disclosure.

The steps of a method or algorithm described in connection with the implementations disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor may read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed aspects is provided to enable a person skilled in the art to make or use the disclosed aspects. Various modifications to these aspects will be readily apparent to those skilled in the art, and the principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed is:

1. A device comprising:
one or more processors configured to:
obtain audio data representing one or more audio signals in a time domain;
process the audio data through a dual-path architecture comprising:
a second data path configured for frequency-domain analysis of the audio data, wherein the second data path is configured to generate filter coefficients based on the frequency-domain analysis of the audio data, and
a first data path configured for time-domain processing, and
apply the filter coefficients, in the time domain, to the audio data to perform time-domain sound separation of the audio data into:
first components representing target signal content in the time domain, and
second components representing noise signal content in the time domain, wherein the target signal content arrives from one or more directions that are different from one or more directions from which the noise signal content arrives;
determine, based on a target signal-to-noise ratio, a first gain to apply to the first components of the audio data and a second gain to apply to the second components of the audio data;
apply the first gain to the first components of the audio data to generate a target signal in the time domain;
apply the second gain to the second components of the audio data to generate a noise signal the time domain; and
combine the target signal and the noise signal to generate an output audio signal in the time domain.

2. The device of claim 1, wherein the one or more processors are configured to obtain data specifying the target signal-to-noise ratio based on a hearing condition of a person, wherein the data specifying the target signal-to-noise ratio is obtained from user-specified settings.

3. The device of claim 1, wherein the first components include first audio data representing speech, and the second components include second audio data representing non-speech sounds.

4. The device of claim 1, wherein the first and second gains are applied in the time-domain processing of the first data path of the dual-path architecture, the first data path having a latency of less than one millisecond, and wherein gain values that correspond to the first gain and the second gain are determined based on filter coefficients generated from the frequency-domain analysis of the second data path of the dual-path architecture.

5. The device of claim 1, further comprising one or more microphones coupled to the one or more processors, and wherein the audio data represents sounds captured by the one or more microphones.

6. The device of claim 1, wherein the one or more processors are integrated into a wearable device.

7. The device of claim 1, further comprising a modem coupled to the one or more processors and configured to receive data specifying the target signal-to-noise ratio from a second device.

8. The device of claim 1, further comprising one or more speakers and one or more microphones coupled to the one or more processors, wherein the one or more microphones include at least one microphone configured to generate the audio data and at least one microphone configured to generate a feedback signal based on sound produced by the one or more speakers responsive to the output audio signal.

9. The device of claim 1, wherein the one or more processors are configured to determine the first gain and the second gain based at least in part on a feedback signal.

10. The device of claim 1, wherein the one or more processors are configured to perform feedback adaptive noise cancellation based on a feedback signal, feedforward adaptive noise cancellation based on the audio data, or both, to generate the output audio signal.

11. The device of claim 1, wherein, to perform the time-domain sound separation of the audio data, the one or more processors are configured to apply first time-domain filter coefficients, from the filter coefficients, based on the frequency-domain analysis, to at least one of the one or more audio signals to generate a first signal representing the first components and to apply second time-domain filter coefficients, from the filter coefficients, based on the frequency-domain analysis, to at least one of the one or more audio signals to generate a second signal representing the second components.

12. The device of claim 11, wherein the one or more processors are configured to perform one or more frequency-domain operations when frequency-domain analysis is performed in the second data path of the dual-path architecture, based on at least one of the one or more audio signals, to determine the first time-domain filter coefficients and the second time-domain filter coefficients.

13. The device of claim 1, wherein, to perform the time-domain sound separation of the audio data, the one or more processors are configured to provide input data based on at least one of the one or more audio signals to one or more neural networks that are trained to generate, based on the input data, a first signal representing the first components and a second signal representing the second components.

14. The device of claim 1, wherein the one or more processors are configured to:
perform one or more transform operations, based on one or more samples of the audio data, to generate frequency-domain audio data when the frequency-domain analysis is performed;
perform beamforming operations, based on the frequency-domain audio data, to distinguish first frequency bins associated with target audio in the one or more samples of the audio data and second frequency bins associated with non-target audio in the one or more samples of the audio data;
determine first time-domain filter coefficients based on the first frequency bins; and
determine second time-domain filter coefficients based on the second frequency bins.

15. The device of claim 1, wherein the one or more processors are configured to:
perform one or more transform operations, based on one or more samples of the audio data, to generate frequency-domain audio data when the frequency-domain analysis is performed;
perform blind source separation operations, based on the frequency-domain audio data, to distinguish first frequency bins associated with target audio in the one or more samples of the audio data and second frequency bins associated with non-target audio in the one or more samples of the audio data;

determine first time-domain filter coefficients based on the first frequency bins; and determine second time-domain filter coefficients based on the second frequency bins.

16. A method comprising:

obtaining, at one or more processors, audio data representing one or more audio signals in a time domain;

processing the audio data through a dual-path architecture comprising:

a second data path configured for frequency-domain analysis of the audio data, wherein the second data path is configured to generate filter coefficients based on the frequency-domain analysis of the audio data, and a first data path configured for time-domain processing, and applying the filter coefficients, in the time domain, to the audio data to perform time-domain sound separation of the audio data into:

first components representing target signal content in the time domain, and second components representing noise signal content in the time domain, wherein the target signal content arrives from one or more directions that are different from one or more directions from which the noise signal content that arrives;

determining, at the one or more processors based on a target signal-to-noise ratio, a first gain to apply to the first components of the audio data and a second gain to apply to the second components of the audio data;

applying the first gain to the first components of the audio data to generate a target signal in the time domain;

applying the second gain to the second components of the audio data to generate a noise signal in the time domain; and combining the target signal and the noise signal to generate an output audio signal in the time domain.

17. The method of claim 16, further comprising obtaining, at the one or more processors, data specifying the target signal-to-noise ratio based on a hearing condition of a person, wherein the data specifying the target signal-to-noise ratio is obtained from user-specified settings.

18. The method of claim 16, wherein the first components include first audio data representing speech and the second components include second audio data representing non-speech sounds.

19. The method of claim 16, wherein the first and second gains are applied in the time-domain processing of the first data path of the dual-path architecture, the first data path having a latency of less than one millisecond, and wherein the gain values that correspond to the first gain and the second gain are determined based on filter coefficients generated from the frequency-domain analysis of the second data path of the dual-path architecture.

20. The method of claim 16, wherein the audio data represents sounds captured by one or more microphones coupled to the one or more processors.

21. The method of claim 16, further comprising performing feedback adaptive noise cancellation based on a feedback signal, performing feedforward adaptive noise cancellation based on the audio data, or both, to generate the output audio signal.

22. The method of claim 16, wherein the performing time-domain sound separation comprises generation of a first signal representing the first components and a second signal representing the second components, wherein the first gain is applied to the first signal and the second gain is applied to the second signal.

23. The method of claim 22, wherein the performing time-domain sound separation comprises:

applying first time-domain filter coefficients, from the filter coefficients, based on the frequency-domain analysis, to at least one of the one or more audio signals to generate the first signal representing the first components; and applying second time-domain filter coefficients, from the filter coefficients, based on the frequency-domain analysis, to at least one of the one or more audio signals to generate the second signal representing the second components.

24. The method of claim 23, further comprising performing one or more frequency-domain operations, based on at least one of the one or more audio signals, to determine the first time-domain filter coefficients and the second time-domain filter coefficients.

25. The method of claim 23, further comprising:

performing one or more transform operations, based on one or more samples of the audio data, to generate frequency-domain audio data;

performing beamforming operations, based on the frequency-domain audio data, to distinguish first frequency bins associated with target audio in the one or more samples of the audio data and second frequency bins associated with non-target audio in the one or more samples of the audio data;

determining the first time-domain filter coefficients based on the first frequency bins; and determining the second time-domain filter coefficients based on the second frequency bins.

26. The method of claim 23, further comprising:

performing one or more transform operations, during the frequency-domain analysis, based on one or more samples of the audio data, to generate frequency domain audio data;

performing blind source separation operations, based on the frequency-domain audio data, to distinguish first frequency bins associated with target audio in the one or more samples of the audio data and second frequency bins associated with non-target audio in the one or more samples of the audio data;

determining the first time-domain filter coefficients based on the first frequency bins; and determining the second time-domain filter coefficients based on the second frequency bins.

27. The method of claim 22, wherein performing the time-domain sound separation includes providing input data based on at least one of the one or more audio signals to one or more neural networks that are trained to generate, based on the input data, the first signal representing the first components and the second signal representing the second components.

28. A non-transitory computer-readable medium storing instructions that, when executed by one or more processors, cause the one or more processors to:

obtain audio data representing one or more audio signals in a time domain;

process the audio data through a dual-path architecture comprising:

a second data path for frequency-domain analysis of the audio data, wherein the second data path is configured to generate filter coefficients based on the frequency-domain analysis on the audio data, and a first data path for time-domain processing, and
apply the filter coefficients, in the time domain, to the audio data to perform time-domain sound separation of the audio data into:
  first components representing target signal content in the time domain, and
  second components representing noise signal content in the time domain, wherein the target signal content arrives from one or more directions that are different from one or more directions from which the noise signal content arrives;
determine, based on a target signal-to-noise ratio, a first gain to apply to the first components of the audio data and a second gain to apply to the second components of the audio data;
apply the first gain to the first components of the audio data to generate a target signal in the time domain;
apply the second gain to the second components of the audio data to generate a noise signal in the time domain; and
combine the target signal and the noise signal to generate an output audio signal in the time domain.

29. The non-transitory computer-readable medium of claim 28, wherein the first and second gains are applied in the time-domain processing of the first data path of the dual-path architecture, the first data path having a latency of less than one millisecond, and wherein gain values that correspond to the first gain and the second gain are determined based on filter coefficients generated from the frequency-domain analysis of the second data path of the dual-path architecture.

30. An apparatus comprising:
  means for obtaining audio data representing one or more audio signals in a time domain;
  means for processing the audio data through a dual-path architecture comprising:
    a second data path configured for frequency-domain analysis of the audio data, wherein the second data path is configured to generate filter coefficients based on the frequency-domain analysis of the audio data, and
    a first data path configured for time-domain processing, and
  means for applying the filter coefficients, in the time domain, to the audio data to perform time-domain sound separation of the audio data into:
    first components representing target signal content in the time domain, and
    second components representing noise signal content in the time domain, wherein the target signal content arrives from one or more directions that are different from one or more directions from which the noise signal content arrives;
  means for determining, based on a target signal-to-noise ratio, a first gain to apply to the first components of the audio data and a second gain to apply to the second components of the audio data;
  means for applying the first gain to the first components of the audio data to generate a target signal in the time domain;
  means for applying the second gain to the second components of the audio data to generate a noise signal in the time domain; and
  means for combining the target signal and the noise signal to generate an output audio signal in the time domain.

* * * * *